US010404892B2

(12) United States Patent
Kashibuchi

(10) Patent No.: US 10,404,892 B2
(45) Date of Patent: Sep. 3, 2019

(54) IMAGE FORMING APPARATUS FOR OUTPUTTING A HALFTONE IMAGE AND IMAGE FORMING METHOD

(71) Applicant: CANON KABUSHIKI KAISHA, Tokyo (JP)

(72) Inventor: Yoichi Kashibuchi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/209,750

(22) Filed: Dec. 4, 2018

(65) Prior Publication Data

US 2019/0191055 A1 Jun. 20, 2019

(30) Foreign Application Priority Data

Dec. 19, 2017 (JP) ................................ 2017-243007
Apr. 27, 2018 (JP) ................................ 2018-086501

(51) Int. Cl.
*H04N 1/00* (2006.01)
*H04N 1/405* (2006.01)
*H04N 1/40* (2006.01)

(52) U.S. Cl.
CPC ......... *H04N 1/4057* (2013.01); *H04N 1/4051* (2013.01); *H04N 1/40068* (2013.01)

(58) Field of Classification Search
CPC . H04N 1/4057; H04N 1/40068; H04N 1/4051
See application file for complete search history.

(56) References Cited

U.S. PATENT DOCUMENTS

2008/0278764 A1* 11/2008 Hirano ............... H04N 1/40087 358/3.13
2012/0287477 A1* 11/2012 Ozawa .................. H04N 1/405 358/3.13

FOREIGN PATENT DOCUMENTS

JP 2017-130751 A 7/2017

* cited by examiner

*Primary Examiner* — Quang N Vo
(74) *Attorney, Agent, or Firm* — Canon USA, Inc., IP Division

(57) ABSTRACT

An image forming method being configured to execute halftone processing using a dithering matrix on input image, output a halftone image, perform correction on the halftone image to shift a pixel at a correction position, and generate an image with a converted lower resolution based on the corrected image, wherein the matrix includes a plural sub-matrices, wherein an arrangement of a threshold in a first sub-matrix is configured to form a first halftone dot having a first line shape for an input image with a predetermined density, wherein an arrangement of a threshold in a second sub-matrix is configured to form a second halftone dot with the same angle as the first line shape and having a center position different from the first halftone dot for the input image with the predetermined density, and wherein the first and second halftone dot form a line shape with a predetermined screen angle.

7 Claims, 28 Drawing Sheets

| TRANSFER POINT | P1 | P2 | P3 | P4 | P5 | P6 | P7 | .... | Pn |
|---|---|---|---|---|---|---|---|---|---|
| DIRECTION | ↑ | ↑ | ↑ | ↓ | ↓ | ↓ | ↓ | .... | ↓ |

FIG.9A 901 900

SUB-SCANNING (arrow upward)

| | | | | | | | | | | | |
|---|---|---|---|---|---|---|---|---|---|---|---|
| 4 | 8 | 17 | 18 | 29 | 30 | 31 | 24 | 23 | 14 | 11 | 5 |
| 3 | 2 | 10 | 12 | 21 | 25 | 32 | 33 | 28 | 20 | 16 | 7 |
| 9 | 1 | 0 | 6 | 15 | 19 | 27 | 34 | 35 | 26 | 22 | 13 |
| 15 | 6 | 0 | 1 | 9 | 13 | 22 | 26 | 35 | 34 | 27 | 19 |
| 21 | 12 | 10 | 2 | 3 | 7 | 16 | 20 | 28 | 33 | 32 | 25 |
| 29 | 18 | 17 | 8 | 4 | 5 | 11 | 14 | 23 | 24 | 31 | 30 |

MAIN-SCANNING (arrow to the right)

FIG.9B 903 902

SUB-SCANNING (arrow upward)

| | | | | | | | | | | | |
|---|---|---|---|---|---|---|---|---|---|---|---|
| 3 | 2 | 10 | 12 | 21 | 25 | 32 | 33 | 28 | 20 | 16 | 7 |
| 9 | 1 | 0 | 6 | 15 | 19 | 27 | 34 | 35 | 26 | 22 | 13 |
| 15 | 6 | 0 | 1 | 9 | 13 | 22 | 26 | 35 | 34 | 27 | 19 |
| 21 | 12 | 10 | 2 | 3 | 7 | 16 | 20 | 28 | 33 | 32 | 25 |
| 29 | 18 | 17 | 8 | 4 | 5 | 11 | 14 | 23 | 24 | 31 | 30 |
| 31 | 24 | 23 | 14 | 11 | 5 | 4 | 8 | 17 | 18 | 29 | 30 |

MAIN-SCANNING (arrow to the right)

FIG.13A 1301 1300

| | | | | | | | | | | | |
|---|---|---|---|---|---|---|---|---|---|---|---|
| 19 | 15 | 11 | 8 | 12 | 16 | 20 | 32 | 37 | 39 | 38 | 33 |
| 17 | 9 | 4 | 3 | 5 | 10 | 18 | 33 | 38 | 39 | 37 | 32 |
| 13 | 6 | 1 | 0 | 2 | 7 | 14 | 31 | 35 | 36 | 34 | 30 |
| 14 | 7 | 2 | 0 | 1 | 6 | 13 | 26 | 28 | 29 | 27 | 25 |
| 18 | 10 | 5 | 3 | 4 | 9 | 17 | 21 | | | | |
| 20 | 16 | 12 | 8 | 11 | 15 | 19 | 21 | | | | |
| 24 | 22 | 23 | 25 | 27 | 29 | 28 | 26 | | | | |
| 23 | 22 | 24 | 30 | 34 | 36 | 35 | 31 | | | | |

SUB-SCANNING

MAIN-SCANNING

FIG.13B 1303 1302

| | | | | | | | | | | | |
|---|---|---|---|---|---|---|---|---|---|---|---|
| 28 | 29 | 27 | 25 | 23 | 22 | 24 | 30 | 34 | 36 | 35 | 31 |
| 19 | 15 | 11 | 8 | 12 | 16 | 20 | 32 | 37 | 39 | 38 | 33 |
| 17 | 9 | 4 | 3 | 5 | 10 | 18 | 33 | 38 | 39 | 37 | 32 |
| 13 | 6 | 1 | 0 | 2 | 7 | 14 | 31 | 35 | 36 | 34 | 30 |
| 14 | 7 | 2 | 0 | 1 | 6 | 13 | 26 | | | | |
| 18 | 10 | 5 | 3 | 4 | 9 | 17 | 21 | | | | |
| 20 | 16 | 12 | 8 | 11 | 15 | 19 | 21 | | | | |
| 24 | 22 | 23 | 25 | 27 | 29 | 28 | 26 | | | | |

SUB-SCANNING

MAIN-SCANNING

IMAGE FORMING APPARATUS FOR OUTPUTTING A HALFTONE IMAGE AND IMAGE FORMING METHOD

BACKGROUND

Field of the Disclosure

The present disclosure generally relates to image forming and, more particularly, to an image forming apparatus and an image forming method.

Description of the Related Art

As a technique for achieving both size reduction and cost reduction in a tandem color image forming apparatus, a technique for correcting image data to cancel distortion resulting from curvature of a main-scan line is proposed. A technique for reproducing an image with a high resolution in a pseudo manner by using a spot-multiplexing technique is proposed. However, if these two techniques are used at the same time, there is a possibility that unevenness occurs in an image on a recording medium. As a technique for improving the unevenness, a method (Japanese Patent Application Laid-Open No. 2017-130751) is discussed in which in a case where two vector components representing the period of a halftone dot in a dithering matrix used for pseudo halftone processing have a combination of even numbers, thresholds are arranged so that the number of pixels in a sub-scanning direction, which constitute a halftone dot, becomes always even. Using this method, unevenness in density of an image on a recording medium can be suppressed without limiting the halftone dot period in the dithering matrix. Therefore, the occurrence of moire between colors can be prevented with less restrictions on the screen ruling and the screen angle of the dithering matrix.

In the technique discussed in Japanese Patent Application Laid-Open No. 2017-130751, the shape of a halftone dot formed with a high resolution in a pseudo manner using a spot-multiplexing technique is reversed in a sub-scanning direction before and after a correction position where image data is corrected so as to cancel distortion resulting from curvature of a main-scan line. Accordingly, the shape of a halftone dot appearing before the correction position is different from the shape of a halftone dot appearing after the correction position. As a result, there is a possibility that unevenness in an image on a recording medium occurs, especially, in an image forming apparatus using a laser scanner (scanning-type optical system).

In the case of executing screen processing, a line shape of a predetermined screen angle is formed of a plurality of halftone dots having different central points and the same screen angle. In this configuration, the line shape slightly fluctuates. This processing makes it difficult to recognize unevenness of an image when correction in the sub-scanning direction is performed before and after the correction position.

SUMMARY

According to one or more aspects of the present disclosure, an image forming apparatus includes a controlling portion having a processor which executes a set of instructions or having a circuitry, the controlling portion being configured to execute halftone processing using a dithering matrix on input image data with a first resolution, and output the image data having been subjected to the halftone processing, perform correction on the image data having been subjected to the halftone processing to shift a pixel in a sub-scanning direction at a correction position in a main-scanning direction, the correction position being determined based on correction information for correcting distortion resulting from curvature of a scan line to form an image according to the output image data, and generate image data with a converted resolution by performing resolution conversion processing on the corrected image data to convert the resolution of the image data from the first resolution to a second resolution lower than the first resolution, wherein the dithering matrix includes a plurality of sub-matrices, wherein an arrangement of a threshold in a first sub-matrix is configured so as to form a first halftone dot having a first line shape for an input image with a predetermined density, wherein an arrangement of a threshold in a second sub-matrix adjacent to the first sub-matrix is configured so as to form a second halftone dot with the same angle as the first line shape and having a center position different from the first halftone dot for the input image with the predetermined density, and wherein the first halftone dot and the second halftone dot form a line shape with a predetermined screen angle in an image having been subjected to the halftone processing, the image being obtained after executing the halftone processing on the input image with the predetermined density by using the first sub-matrix and the second sub-matrix.

Further features of the present disclosure will become apparent from the following description of exemplary embodiments with reference to the attached drawings.

BRIEF DESCRIPTION OF THE DRAWINGS

FIGS. 9A and 9B each illustrate a cell growth order according to the first exemplary embodiment.

FIGS. 13A and 13B each illustrate a cell growth order according to the second exemplary embodiment.

DESCRIPTION OF THE EMBODIMENTS

Figure 1:
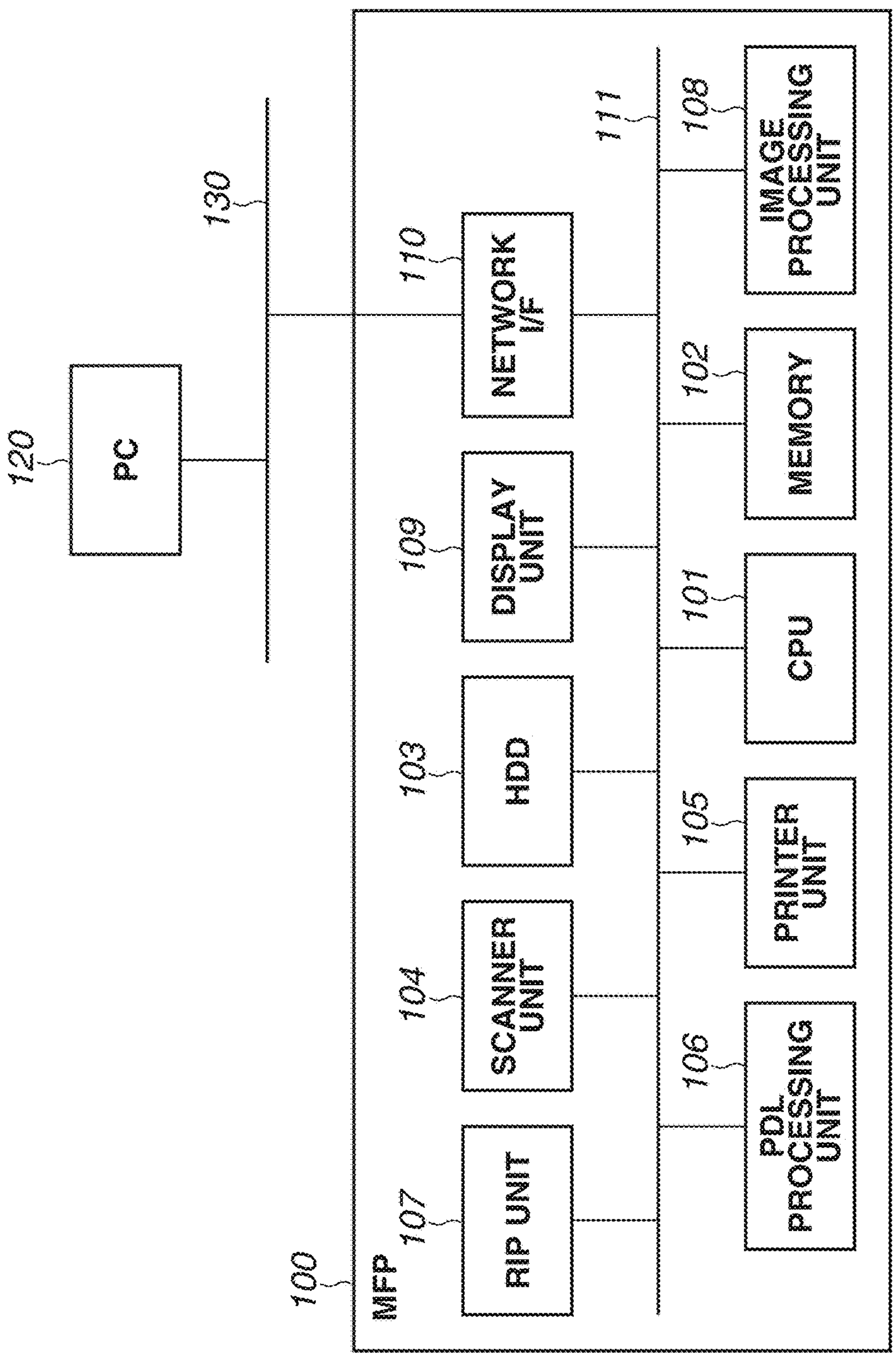
FIG. 1 is a block diagram illustrating an example of a configuration of a printing system.

Various exemplary embodiments, features, and aspects of the present disclosure will be described in detail below with reference to the accompanying drawings. The configurations illustrated in the following exemplary embodiments are merely examples, and the present disclosure is not limited to the following exemplary embodiments illustrated in the drawings.

The present exemplary embodiment illustrates an example of a multi-function peripheral (MFP) having a plurality of functions, such as a copy function and a printer function, as a color image forming apparatus. FIG. 1 is a block diagram illustrating an example of a configuration of a printing system according to the present exemplary embodiment. The printing system illustrated in FIG. 1 includes an MFP 100 and a personal computer (PC) 120. The MFP 100 and the PC 120 are connected to each other via a network 130 such as a local area network (LAN).

The MFP 100 includes a central processing unit (CPU) 101, a memory 102, a hard disk drive (HDD) 103, a scanner unit 104, a printer unit 105, a Page Description Language (PDL) processing unit 106, a raster image processor (RIP) unit 107, an image processing unit 108, a display unit 109, and a network interface (I/F) 110. These units are connected to one another via an internal bus 111.

The CPU 101, which may include one or more processors, one or more memories, circuitry, or a combination thereof, may collectively control the MFP 100. The memory 102 includes a read-only memory (ROM) that stores various commands (including application programs) executed by the CPU 101 to control the MFP 100 and various data, and a random access memory (RAM) that functions as a work area for the CPU 101. The HDD 103 is a large-capacity storage medium that stores various programs, image data, and the like. The scanner unit 104 optically reads a document that is placed on a platen glass or the like (not illustrated), and acquires image data in bitmap format.

The PDL processing unit 106 analyzes PDL data included in a print job received from the PC 120, and generates a display list (DL) as intermediate data. The generated DL is sent to the RIP unit 107. The RIP unit 107 executes rendering processing based on the received DL and generates contone (multivalued) bitmap image data. The term "contone bitmap image data" refers to image data having an 8-bit or 10-bit depth and multiple gradation levels, representing colors in a color space, such as an RGB color space, and having information on these colors for each discrete pixel. Specifically, drawing bitmap data and attribute bitmap data are generated. Prior to the generation of these pieces of data, the attribute information on a drawing target object is generated for each pixel. The attribute information used in this case is determined in accordance with the following criteria.

In a case of being specified by a character drawing command (character type or character code): text attribute In a case of being specified by a line drawing command (coordinate point, length, and thickness): line attribute In a case of being specified by a graphics drawing command (rectangle, shape, and coordinate point): graphics attribute In a case of being specified by an image drawing command (set of points): image attribute Based on the attribute information, pixels to be drawn in accordance with the processing resolution of the printer unit 105 are formed and drawing bitmap data in which information (multivalued) on a color to be drawn in each pixel is input is generated. The present exemplary embodiment is based on the premise that pseudo high-resolution processing for drawing a dot with a resolution (e.g., 1,200 dpi) higher than the resolution (e.g., 600 dpi) of the printer unit 105, is performed. Accordingly, the resolution of the drawing bitmap data to be generated in this case is 1,200 dpi. Further, attribute bitmap data storing attribute information for each pixel is generated so as to correspond to each pixel of the drawing bitmap. The generated drawing bitmap and attribute bitmap are temporarily stored in the memory 102 or the HDD 103, or are sent to the image processing unit 108.

The image processing unit 108 performs necessary image processing on the bitmap format image data to be printed corresponding to the print job from the PC 120 or optically read by the scanner unit 104. The image processing unit 108 will be described in detail below. The bitmap format image data obtained after the image processing is sent to the printer unit 105.

The printer unit 105 forms an electrostatic latent image in such a manner that a laser scanner (not illustrated) irradiates exposure light (laser beam) by an electrophotographic method based on the image data generated by the image processing unit 108, and forms a single color toner image by developing the electrostatic latent image. Then, the printer unit 105 forms a multicolored toner image by superimposing the single color toner images and forms a color image on a recording medium by transferring the multicolored toner image onto the recording medium (sheet) and fixing the multicolored toner image.

The display unit 109 includes a liquid crystal panel or the like having a touch screen function and on which various kinds of information are displayed. In addition, a user performs various operations and provides various instructions via a screen displayed on the display unit 109. The network I/F 110 is an interface for performing communication, such as transmission and reception of a print job, with the PC 120 connected via the network 130.

The components of the image forming apparatus are not limited thereto. For example, an input unit including a mouse, a keyboard, and the like may be provided for the user to perform various operations, in place of a touch screen. Components may be added appropriately to the configuration of the image forming apparatus, and the configuration may be changed appropriately depending on the intended use or the like thereof.

Figure 2:
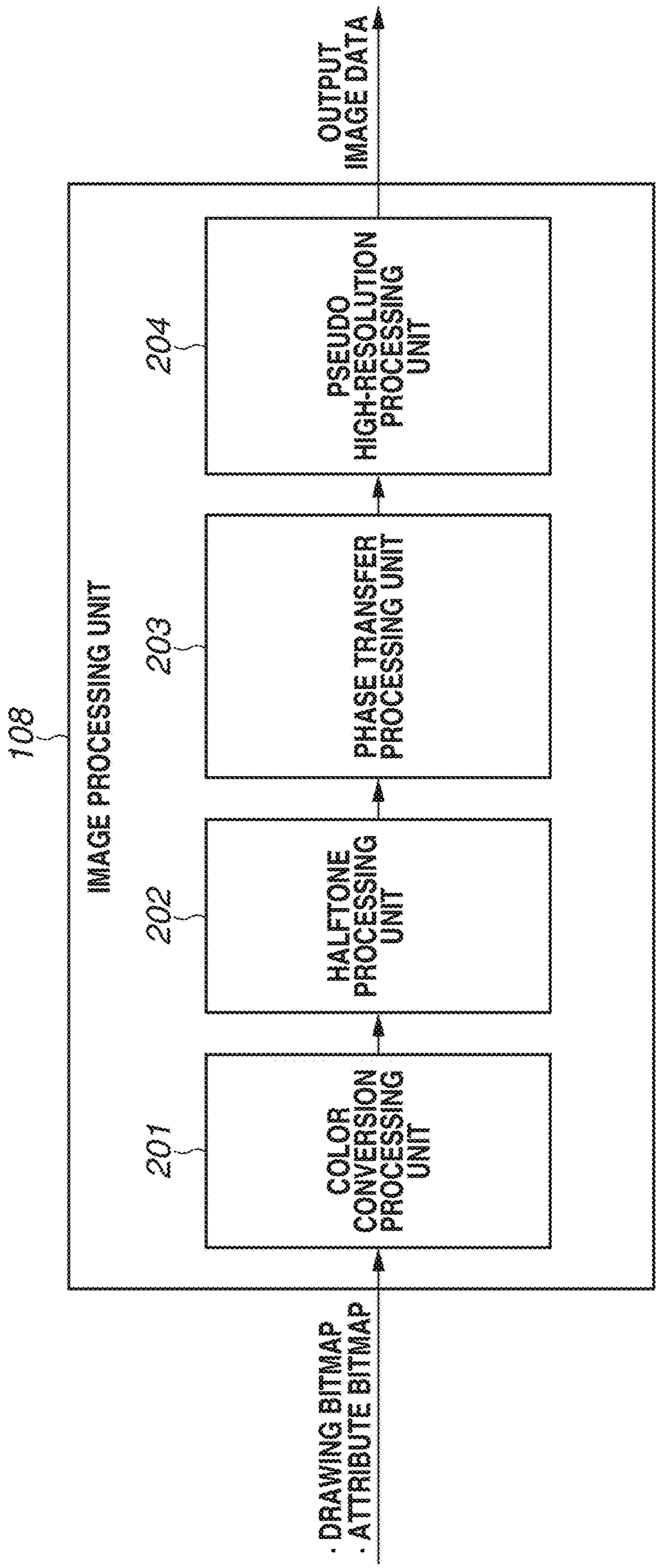
FIG. 2 is a block diagram illustrating an internal configuration of an image processing unit.

FIG. 2 is a block diagram illustrating an internal configuration of the image processing unit 108. The image processing unit 108 includes a color conversion processing unit 201, a halftone processing unit 202, a phase transfer processing unit 203, and a pseudo high-resolution processing unit 204. Each processing unit will be described below. In the present exemplary embodiment, it is assumed a case where the image processing unit 108 is implemented by a hardware circuit such as an application specific integrated circuit (ASIC). However, the configuration of the image processing unit 108 is not limited to this configuration. For example, a general-purpose processor, such as the CPU 101, and a hardware circuit may cooperate with each other to implement various kinds of image processing. For example, various kinds of image processing can be implemented by a processor such as the CPU 101 reading a command that configures an image processing program, and executing the command.

The color conversion processing unit 201 performs color conversion processing for converting a color space of input image data into a color space supported by the printer unit 105. In a case where the printer unit 105 is a four-color four-drum tandem printer unit that uses toner of four colors in total, i.e., cyan (C), magenta (M), yellow (Y), and black (K), the color space is converted into a CMYK color space.

The halftone processing unit 202 performs halftone processing by dithering for each color screen for the image data whose color space has been converted into the color space supported by the printer unit 105. Dithering uses a threshold matrix (dithering matrix) in which different thresholds are arranged within a matrix having a predetermined size. The halftone processing unit 202 sequentially develops the dithering matrix on the multivalued bitmap data, which is input image data, in the form of tile and compares a threshold with an input pixel value. If the result of the comparison indicates that the input pixel value is greater than the threshold, and the halftone processing unit 202 turns on the pixel, and if the result of the comparison indicates that the input pixel value is less than or equal to the threshold, the halftone processing unit 202 turns off the pixel, thereby representing a halftone image. By the halftone processing, the input image data with continuous gradation (multivalued bitmap data) is converted into halftone image data (binary bitmap data) with area gradation made up of halftone dots. Different dithering matrices for each color screen may be used. The present exemplary embodiment is characterized by dithering matrices as described in detail below.

Figure 3A:
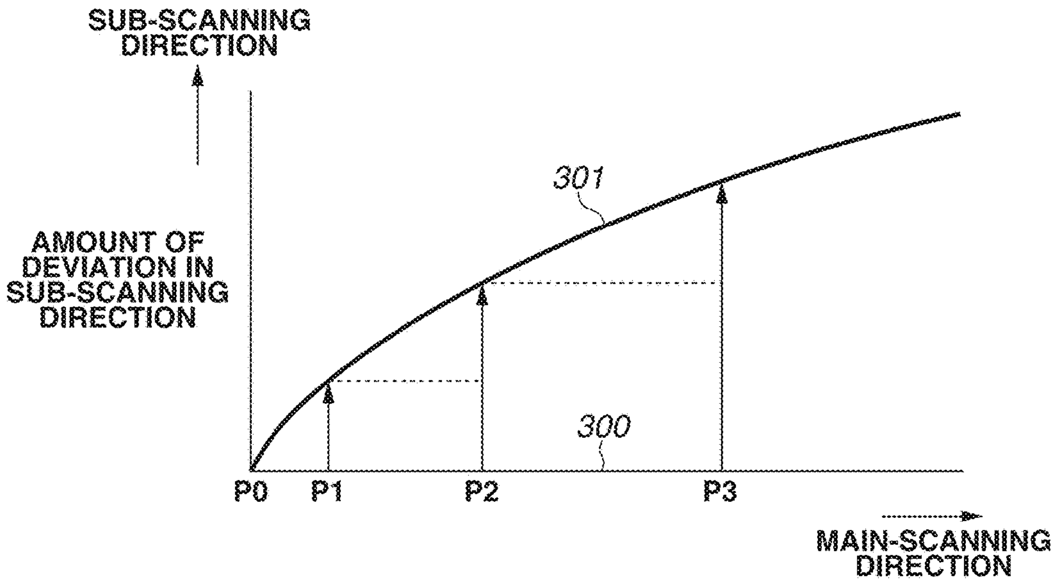
FIGS. 3A and 3B are graphs each illustrating an example of curve characteristics of a scan line of a laser beam.
Figure 3B:
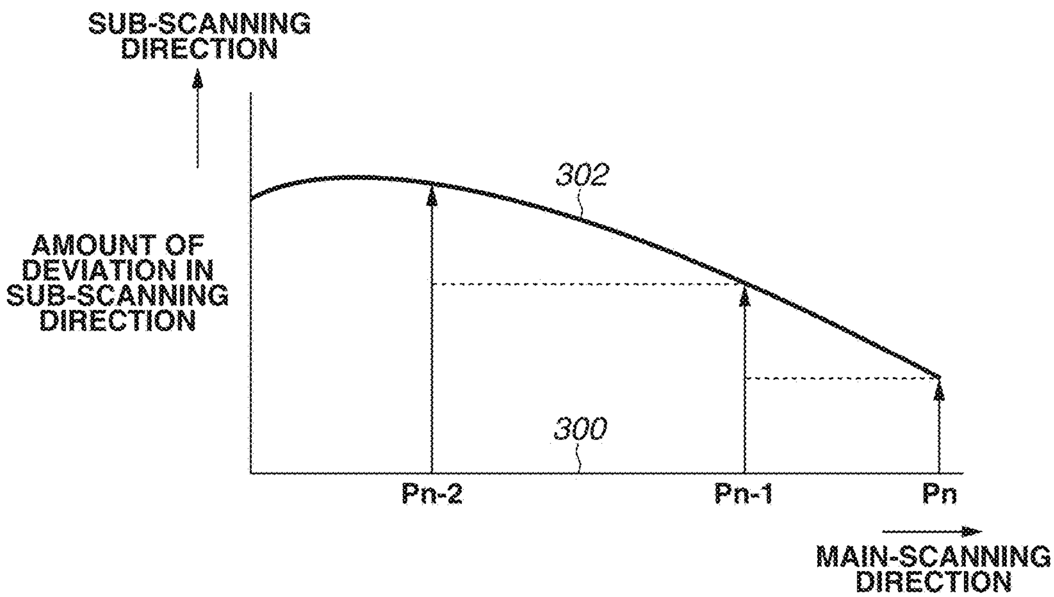
Figure 4A:
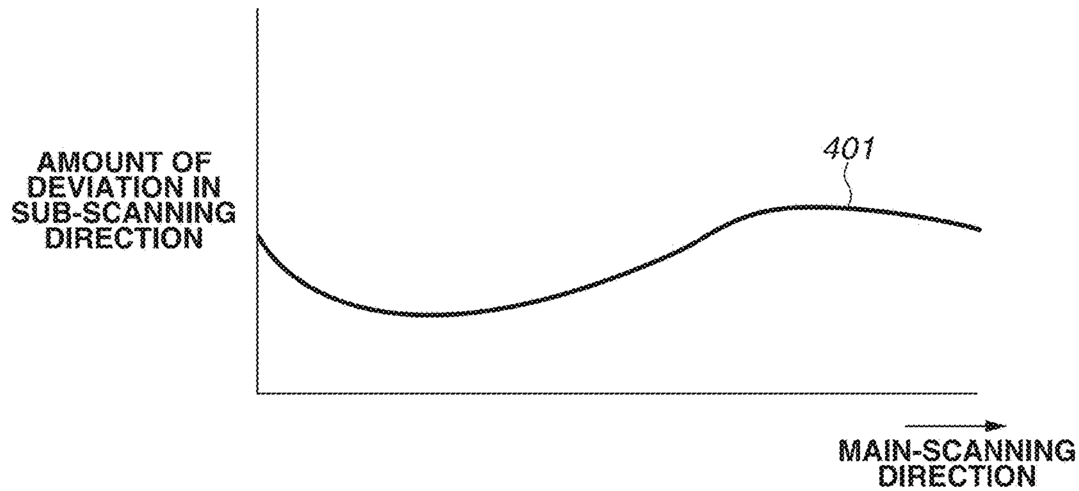
FIG. 4A is a graph illustrating curve characteristics of a scan line of a laser beam.
Figure 4B:
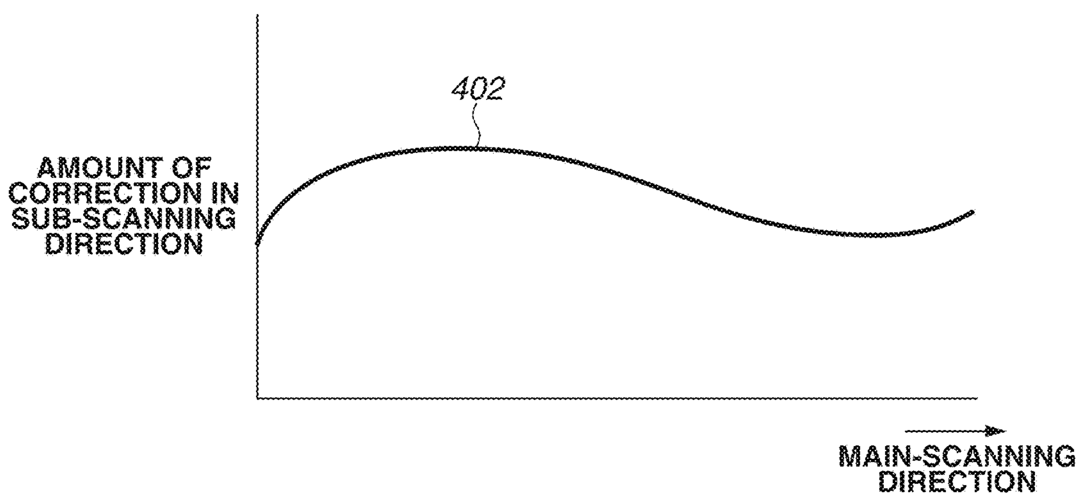
FIG. 4B is a graph illustrating a correction amount used to correct the curve characteristics illustrated in FIG. 4A.

The phase transfer processing unit 203 performs line shift processing to shift the line of the image data (in this case, binary bitmap data) obtained after the halftone processing in the sub-scanning direction, thereby correcting the deviation (curvature) of a laser beam scan line of each color of CMYK. This line shift processing is also referred to as "phase transfer processing". FIGS. 3A and 3B each illustrate an example of curve characteristics of a scan line of a laser beam. A curve 301 illustrated in FIG. 3A indicates characteristics in a case where the laser beam scan line deviates in the upward direction of the sub-scanning direction (conveyance direction of a sheet) as the laser beam scan line advances in a main-scanning direction. A curve 302 illustrated in FIG. 3B indicates characteristics in a case where the laser beam scan line deviates downward in the sub-scanning direction as the laser beam scan line advances in the main-scanning direction. In FIG. 3A and FIG. 3B, a straight line 300 indicates ideal characteristics of the scan line in a case where a scan is performed in a direction perpendicular to the sub-scanning direction, which does not deviate in the sub-scanning direction as the laser beam scan line advances in the main-scanning direction. FIG. 4A illustrates curve characteristics (amount of deviation) of the laser beam scan line, and a curve 401 indicates the curve characteristics of the laser beam corresponding to the main-scanning width. On the other hand, FIG. 4B illustrates an amount of correction (correction characteristics) at the time of correcting the curve characteristics illustrated in FIG. 4A. As can be seen from FIGS. 4A and 4B, the correction characteristics indicated by a curve 402 are opposite characteristics that cancel out the curve characteristics of the curve 401.

Figures 5A, 5B:
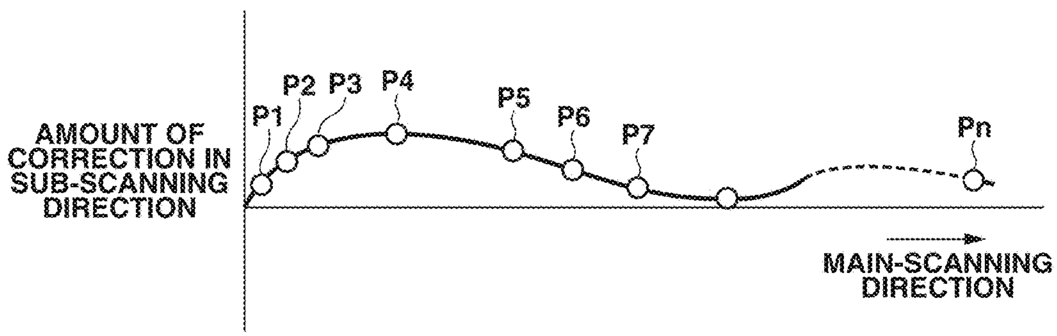
FIGS. 5A and 5B each illustrate an example of correction data used for phase transfer processing.

FIGS. 5A and 5B each illustrate an example of specific correction values (correction data) that are used in the phase transfer processing. In FIG. 5A, the vertical axis represents the amount of correction and the horizontal axis represents the pixel position in the main-scanning direction. In FIG. 5A, each of P1, P2, . . . , Pn indicates a point (transfer point) at which the scan line deviates by one pixel in the sub-scanning direction due to the above-described curve characteristics. The pixel position of the transfer point in the main-scanning direction is also referred to as a "transfer position" or "correction position". FIG. 5B illustrates the direction in which the scan line up to the next transfer point is shifted at each of the transfer points P1, P2, . . . , Pn. The shift direction at the transfer point includes an upward direction and a downward direction. For example, the transfer point P2 is a point at which the line should be further shifted by one pixel in the upward direction up to the next transfer point P3. Accordingly, the transfer direction at the transfer point P2 corresponds to the upward direction (↑). Similarly, at the transfer point P3, the transfer direction corresponds to the upward direction (↑) up to the next transfer point P4. The transfer direction at the transfer point P4 corresponds to the downward direction (↓) different from the previously described direction.

Figure 6A:
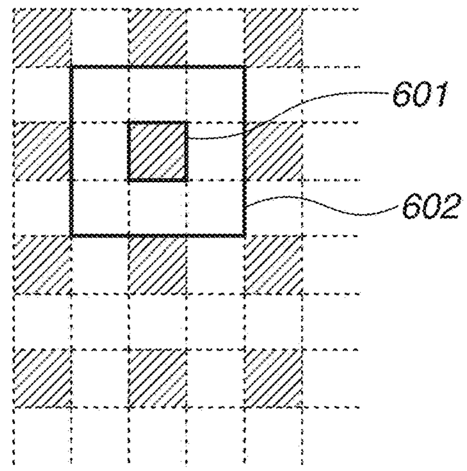
FIG. 6A illustrates a processing-target pixel and a processing rectangle in bitmap data to which pseudo high-resolution processing is applied.
Figure 6B:
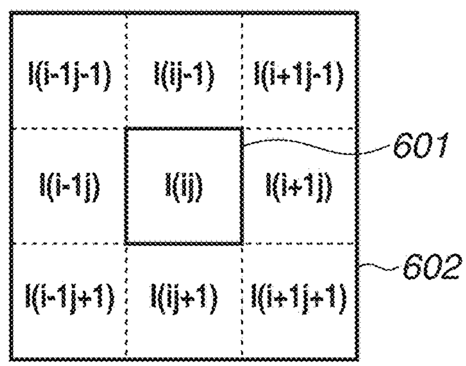
FIG. 6B is an enlarged view of the processing rectangle.
Figure 6C:
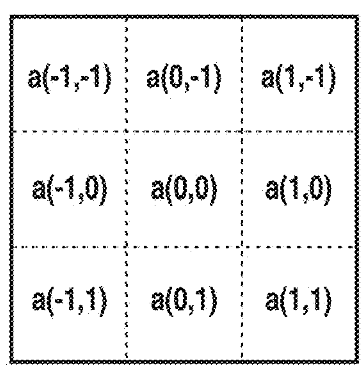
FIG. 6C is a conceptual diagram illustrating a multivalued filter corresponding to the processing rectangle.
Figure 6D:
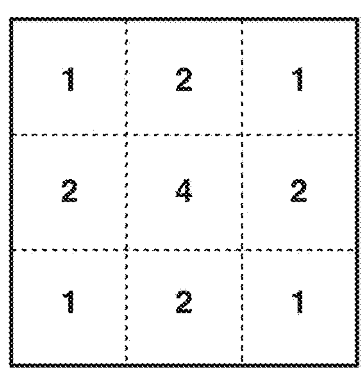
FIG. 6D illustrates a specific example of product-sum operation coefficients.

The pseudo high-resolution processing unit 204 performs processing (pseudo high-resolution processing) to convert the halftone image data obtained after the phase transfer processing into data representing a high resolution in a pseudo manner by reducing the resolution. By this processing, the bitmap data with a resolution (e.g., 1,200 dpi) at the time of halftone processing is converted into bitmap data with a lower resolution (e.g., 600 dpi) both in the main-scanning direction and in the sub-scanning direction. The lower resolution is the resolution of the printer unit 105. FIGS. 6A to 6C schematically illustrates the pseudo high-resolution processing. FIG. 6A illustrates a processing-target pixel (interest pixel 601) and a processing rectangle 602 in binary bitmap data to which the pseudo high-resolution processing is applied. The pseudo high-resolution processing is performed by performing sampling while shifting the processing rectangle 602 and by performing a product sum operation using a multivalued filter within the area of the processing rectangle 602. In this case, the processing rectangle 602 is an area formed of nine pixels including the interest pixel 601 and eight adjacent pixels. In FIG. 6A, shaded cells 603 each indicate the position (sampling position) of the interest pixel 601 for which sampling is performed. An arrangement interval (sampling interval) between the sampling positions 603 is determined by the reduction rate of the resolution in the main-scanning direction (lateral direction) and in the sub-scanning direction (longitudinal direction). In the present exemplary embodiment, the resolution conversion is performed from 1,200 dpi into 600 dpi both in the main-scanning direction and in the sub-scanning direction, and thus the sampling interval is 2 (=1,200/600) pixels, i.e., sampling is performed every two pixels. FIG. 6B is an enlarged view of the processing rectangle 602, and FIG. 6C is a conceptual diagram of the multivalued filter corresponding to the processing rectangle 602. The multivalued filter according to the present exemplary embodiment has nine product sum operation coefficients "a" corresponding to the respective pixels constituting the processing rectangle 602. FIG. 6D illustrates a specific example of the product sum operation coefficients "a" within the multivalued filter illustrated in FIG. 6C. Assuming that the coordinates of the interest pixel 601 are represented by (i, j) and the pixel value is represented by I (i, j), an output value OUT, which is the result of the product sum operation, is obtained by the following expression (1).

$$OUT = \frac{15}{\sum_{k=-1}^{l} \sum_{l=-1}^{l} a_{(k,l)}} \sum_{k=-1}^{l} \sum_{l=-1}^{l} I_{(i+k,j+l)} a_{(k,l)} \tag{1}$$

The above-described expression (1) means that the product of the pixel value I (i, j) of each pixel, which is represented by binary values within the processing rectangle 602, and the product sum operation coefficient "a" corresponding to the coordinates is summed for the nine pixels and the sum is normalized into 16 values "0 to 15". This makes it possible to convert the number of gradation levels from 2 into 16 while converting the resolution of the image data from 1,200 dpi into 600 dpi. By performing the pseudo high-resolution processing as described above, the effect of spot-multiplexing is obtained and it is possible to perform printing with a resolution higher than the actual resolution in a pseudo manner In this way, since it is possible to express an image whose resolution corresponds to 1,200 dpi by using 600 dpi bitmap data in the above-described example, even in the case where the capability of the printer unit 105 corresponds to a print resolution of 600 dpi, it is possible to print text or a line whose resolution corresponds to 1,200 dpi.

Figure 7:
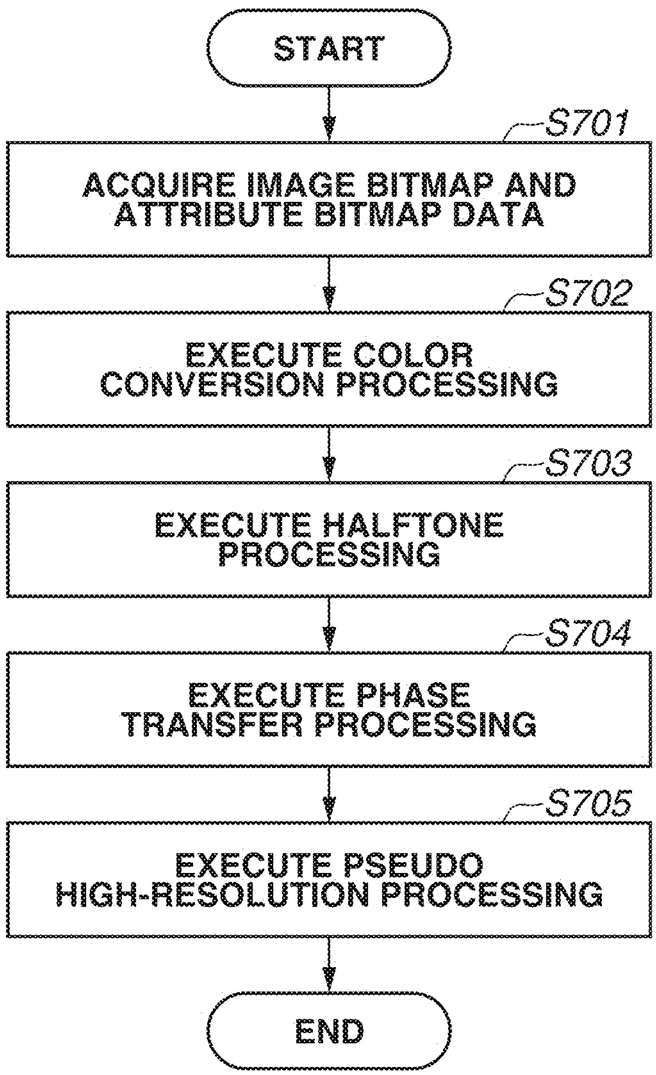
FIG. 7 is a flowchart illustrating a processing flow in an image processing unit.

Next, a processing flow in the image processing unit 108 during print processing will be described. FIG. 7 is a flowchart illustrating a processing flow in the image processing unit 108. A series of processes in the processing is carried out by the CPU 101 reading a computer-executable program describing a procedure to be described below, loading from the ROM into the RAM in the memory 102, and executing the loaded program.

In step 701, in response to a print instruction, the CPU 101 acquires drawing bitmap data and attribute bitmap data generated by the RIP unit 107. In step 702, the color conversion processing unit 201 converts a color space (in this case, an RGB color space) of each pixel of the drawing bitmap into a color space (in this case, a CMYK color space) supported by the printer unit 105 by using a color conversion look-up table (LUT) or a matrix operation.

In step 703, the halftone processing unit 202 selects a dithering matrix based on the attribute information about each pixel of the attribute bitmap. For example, in a case of the text attribute or line attribute, a high screen ruling dithering matrix is selected, and in a case of the graphics attribute or image attribute, a low screen ruling dithering matrix is selected. Further, the halftone processing unit 202 performs halftone processing on each pixel in the drawing bitmap by using the selected dithering matrix. In this way, the bitmap data (halftone image data) in which each multivalued pixel value of the drawing bitmap is converted into a binary value is generated. The dithering matrix used in the present exemplary embodiment will be described in detail below.

In step 704, the phase transfer processing unit 203 corrects the curvature of the laser beam scan line by performing the above-described phase transfer processing on the binary bitmap data (e.g., 1,200 dpi) obtained after the halftone processing. In step 705, the pseudo high-resolution processing unit 204 generates the multivalued bitmap data (e.g., 600 dpi) whose number of values is greater than two by performing the above-described pseudo high-resolution processing on the corrected binary bitmap data on which the phase transfer processing has been performed. The generated multivalued bitmap data is sent to the printer unit 105 and subjected to the print processing.

Next, the dithering matrix used in the present exemplary embodiment and advantageous effects of the dithering matrix will be described in detail with reference to FIGS. 8A and 8B, FIGS. 9A and 9B, FIGS. 10A, 10B, and 10C, and FIGS. 11A, 11B, and 11C.

Figure 8A:
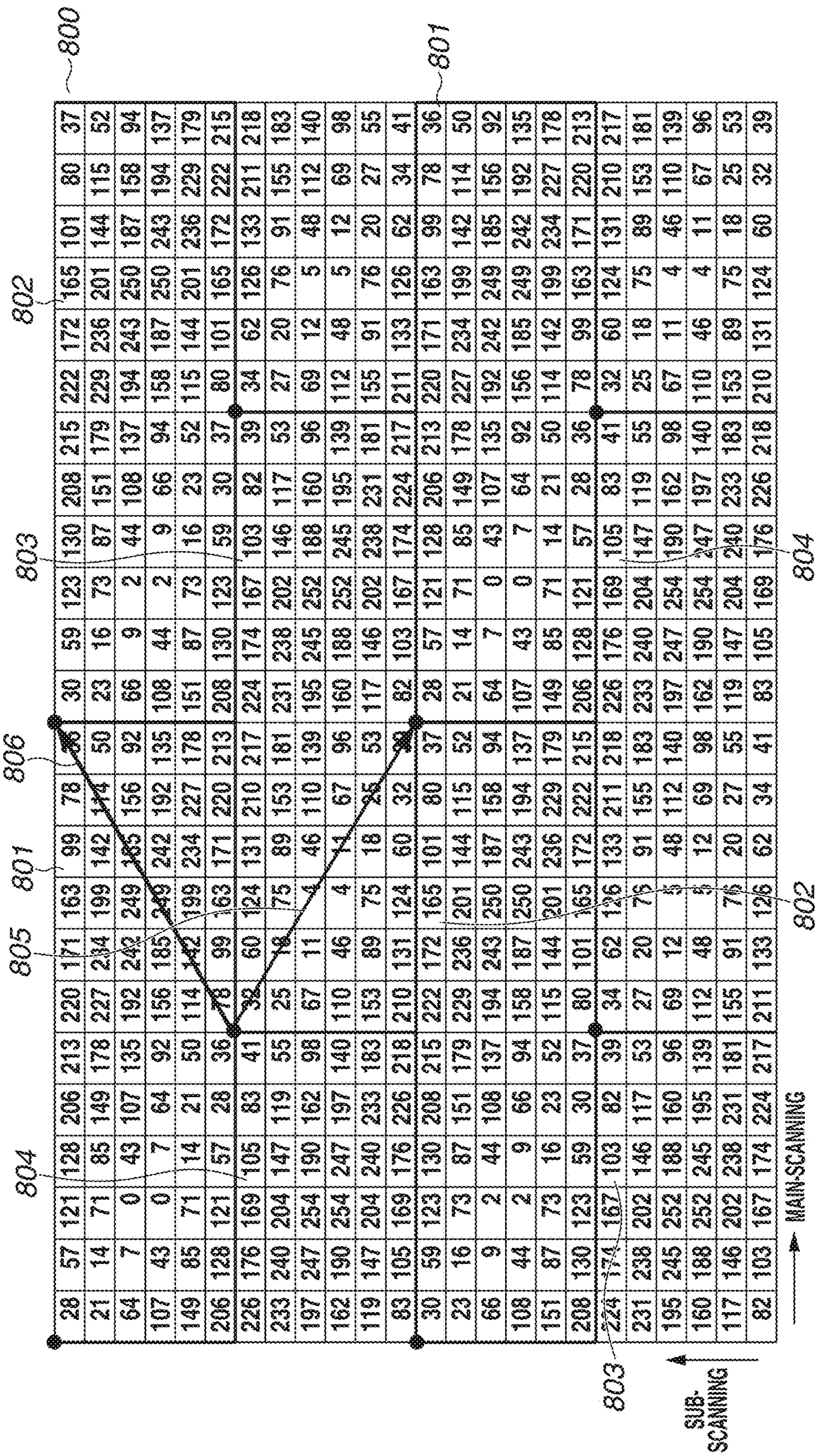
FIGS. 8A and 8B each illustrate an example of a binary dithering matrix according to a first exemplary embodiment.
Figure 8B:
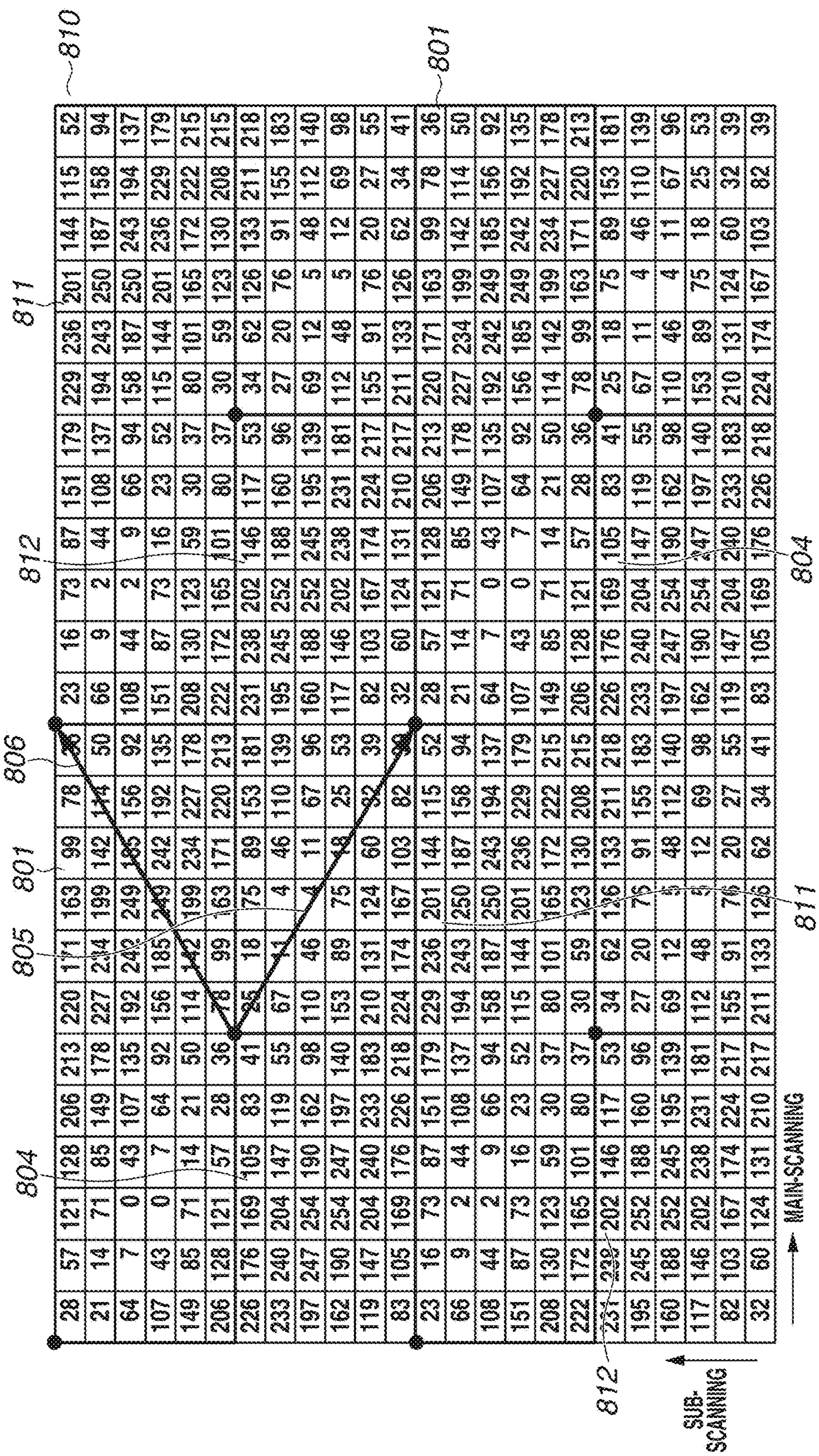

FIGS. 8A and 8B each illustrate an example of the dithering matrix according to the present exemplary embodiment. A dithering matrix 800 illustrated in FIG. 8A includes four cells (sub-matrices) 801, 802, 803, and 804, each of which forms a halftone dot. The sub-matrices 801 and 802 are adjacent to each other in the lateral direction, and the sub-matrices 803 and 804 are also adjacent to each other in the lateral direction. The number of thresholds in the sub-matrix 801 is the same as the number of thresholds in the sub-matrix 802. FIGS. 9A and 9B each illustrate an example of a growth order of cells that constitute the dithering matrix according to the present exemplary embodiment. FIG. 9A illustrates a cell growth order 900. Cells 801 to 804 illustrated in FIGS. 8A and 8B are each configured to have the same growth order and different thresholds by integral-multiplying the cell growth order 900 by the total number of cells and then adding different values less than the total number of cells to each cell. For example, in the present exemplary embodiment, the cell growth order 900 has a value ranging from 0 to 35. The thresholds of the cells 801 to 804 are each obtained by multiplying the cell growth order 900 by 4, and adding 0 to the cell 801, adding 1 to the cell 802, adding 2 to the cell 803, and adding 3 to the cell 804. The threshold included in the cell 801 ranges from 0 to 140. The threshold included in the cell 802 ranges from 1 to 141. The threshold included in the cell 803 ranges from 2 to 142. The threshold included in the cell 804 ranges from 3 to 143. The value of each threshold is obtained by normalizing the value less than a maximum input pixel value according to the input pixel value of image data input to the halftone processing unit 202. In the present exemplary embodiment, the maximum input pixel value of the image data input to the halftone processing unit 202 is 255, and thus the threshold is normalized to a value ranging from 0 to 254. Thus, the cells 801 to 804 include the maximum threshold 143 before normalization. Accordingly, after the normalization, the cell 801 includes a threshold ranging from 0 to 249, the cell 802 includes a threshold ranging from 2 to 250, the cell 803 includes a threshold ranging from 4 to 252, and the cell 804 includes a threshold ranging from 5 to 254. Cells arranged to have different thresholds and the same order of thresholds included in the respective cells as described above are each generally referred to as a sub-matrix. The cells 801 to 804 are arranged in such a manner that a halftone dot has a predetermined periodicity at a predetermined angle. This halftone dot cycle can be represented by two vectors. A first vector 805 has components of 6 in the main-scanning direction and −6 in the sub-scanning direction. A second vector 806 has components of 6 in the main-scanning direction and 6 in the sub-scanning direction. The length of each of the two vectors is obtained by the square-root of sum of squares of the components and is about 8.49. A cycle of a halftone dot is generally represented by screen ruling and is obtained by dividing a resolution by a length of a vector. The dithering matrix 800 represented by the two vectors forms halftone dots each having a screen ruling of 141 lpi and an angle of 45 degrees at a resolution of 1,200 dpi. In the cell growth order 900, the same growth orders are set point-symmetrically to a growth center 901 that corresponds to the center of two pixels in the sub-scanning direction.

Figure 10A:
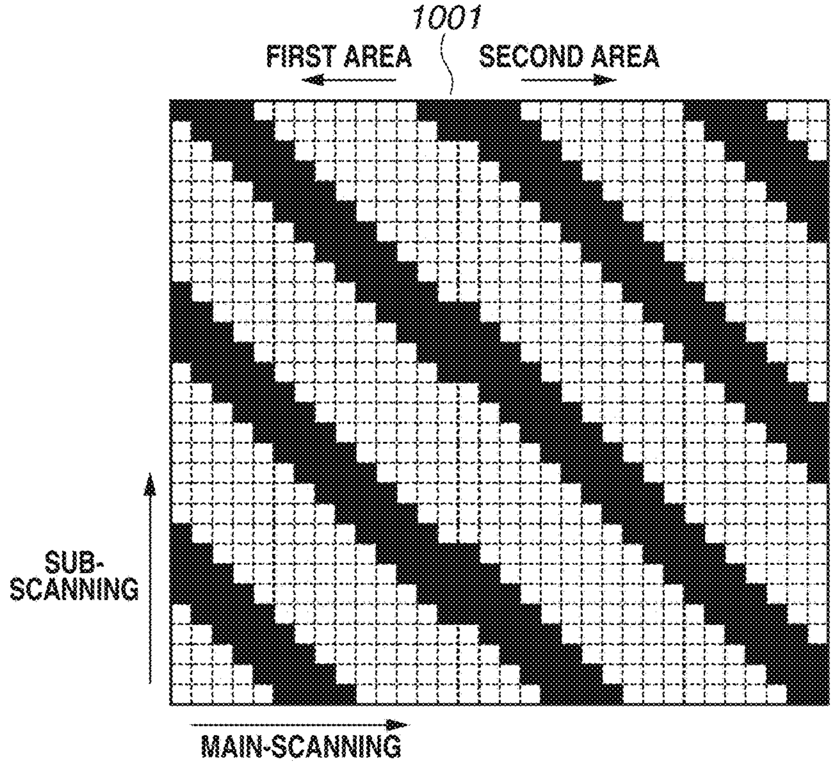
FIGS. 10A, 10B, and 10C each illustrate an example of bitmap data obtained using the dithering matrix according to the first exemplary embodiment.
Figure 10B:
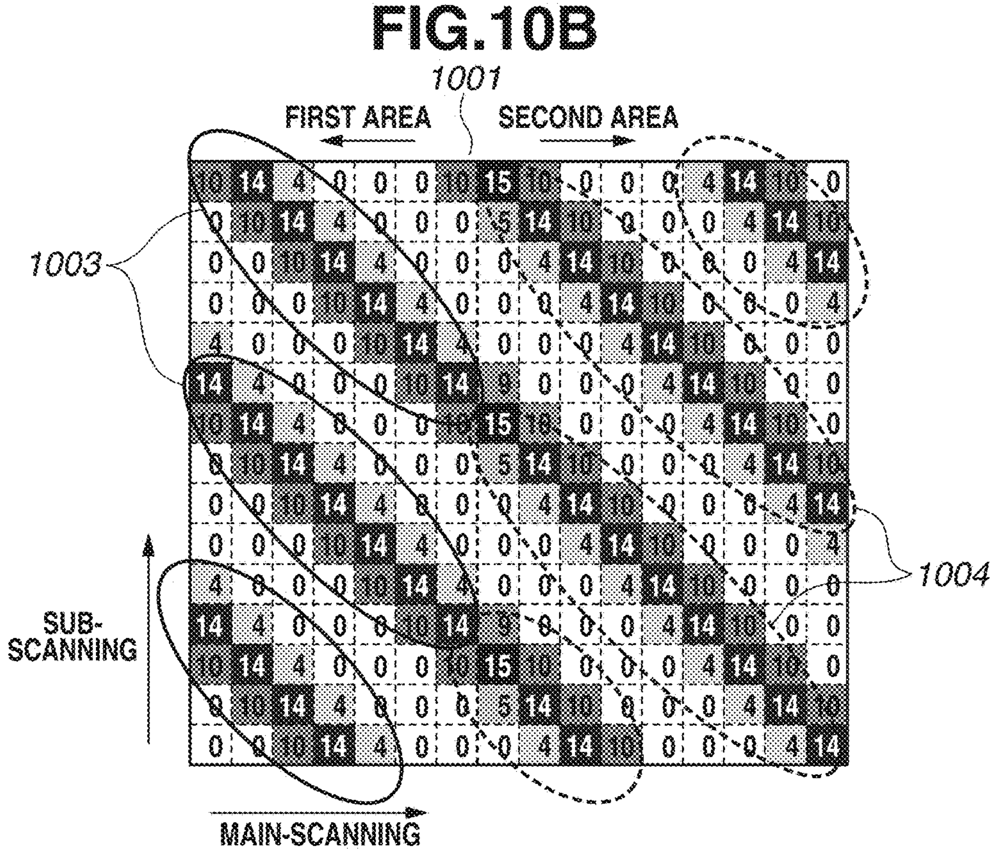
Figure 10C:
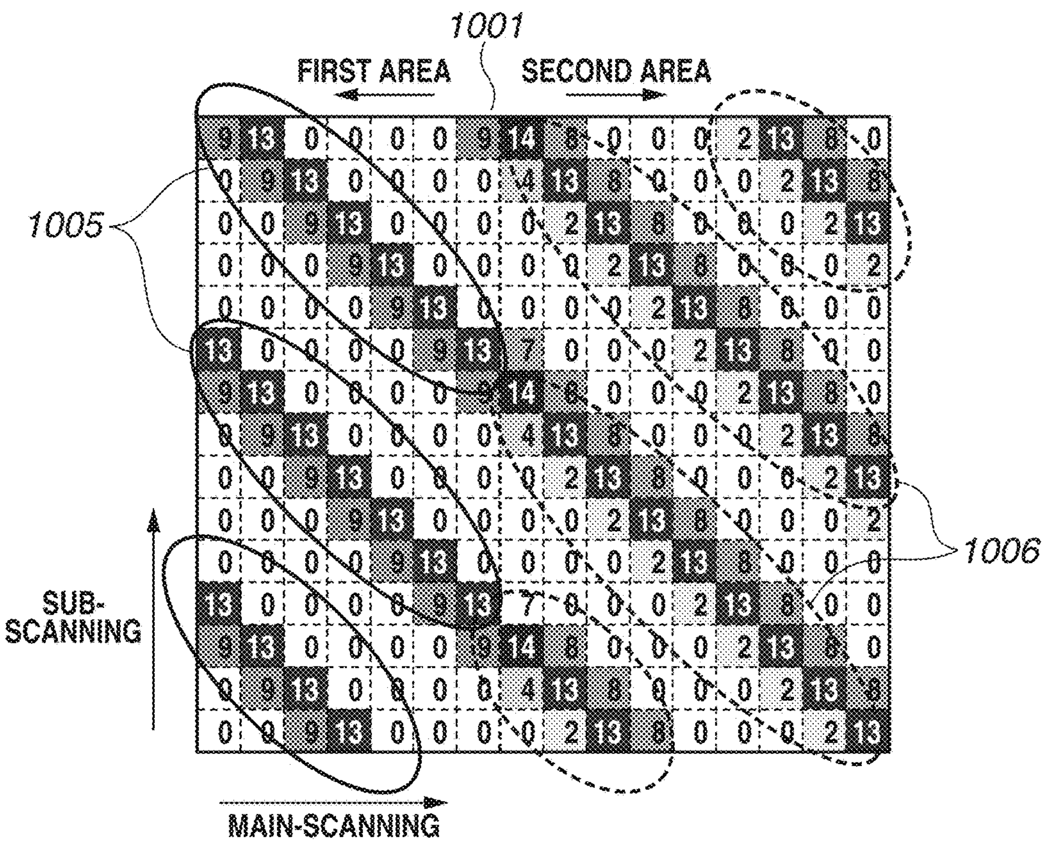

FIGS. 10A, 10B, and 10C each illustrate a halftone dot formed using the dithering matrix illustrated in FIG. 8A. FIG. 10A illustrates binary bitmap data (1,200 dpi) obtained by performing halftone processing on the drawing bitmap in which all input pixel values are 84 by using the dithering matrix 800, and then performing phase transfer processing. In FIG. 10A, location 1001 indicates a transfer point (see the transfer point P3 illustrated in FIG. 4B) at which the line should be shifted by one pixel in the upward direction of the sub-scanning direction. It can be seen that the halftone dot within a second area is shifted by one pixel (one line) in the upward direction of the sub-scanning direction with the transfer point 1001 as a boundary. In a first area and the second area, halftone dots are connected and ON pixels are arranged in a line shape. The line on which the ON pixels are arranged is formed in the direction of the vector 805. As the input pixel value increases, the area ratio is increased so as to increase the line in the direction of the vector 806, thereby allowing the halftone dots to grow. FIG. 10B illustrates multivalued bitmap data (600 dpi) obtained after performing pseudo high-resolution processing on the binary bitmap data (1,200 dpi) obtained after the phase transfer processing as illustrated in FIG. 10A. In the first area illustrated in FIG. 10B, halftone dots are formed in such a manner that pixel values 10 are arranged on the left side of pixel values 14 as indicated by frames 1003 in the main-scanning direction and pixel values 4 are arranged on the right side of the pixel values 14. On the other hand, in the second area, halftone dots are formed in such a manner that pixel values 4 are arranged on the left side of pixel values 14 as indicated by frames 1004 in the main-scanning direction and pixel values 10 are arranged on the right side of the pixel values 14. It can be seen that halftone dots in the first area and the second area illustrated in FIG. 10B are formed in a point symmetrical manner, while the total number of halftone dots in the first area is the same as that in the second area. FIG. 10C schematically illustrates halftone dots formed by emitting a laser beam by the laser scanner using the multivalued bitmap data illustrated in FIG. 10B. The laser scanner sequentially emits exposure light (laser beam) corresponding to pixel values in the main-scanning direction. It is known that, for example, when the responsiveness of exposure light to pixel values has no linearity, the arrangement of pixel values in the main-scanning direction is greatly influenced. In the first area illustrated in FIG. 10C, halftone dots in which pixel values 9 are arranged on the left side of pixel values 13 as indicated by frames 1005 in the main-scanning direction and pixel values 0 are arranged on the right side of the pixel values 13, are formed by using the laser scanner. In the second area illustrated in FIG. 10C, halftone dots in which pixel values 2 are arranged on the left side of pixel values 13 as indicated by frames 1006 in the main-scanning direction and pixel values 8 are arranged on the right side of the pixel values 13, are formed by using the laser scanner. Thus, it can be seen that, in the case of using the dithering matrix 800, halftone dots formed on a recording medium by using the laser scanner in the first area are different from those in the second area. In this case, in the above-described situation, on a recording medium, different halftone dots are formed in the first area and the second area, which are formed on both sides of the transfer point as a boundary, and the first and second areas are reproduced with different densities and colors.

A dithering matrix 810 illustrated in FIG. 8B includes four cells 801, 804, 811, and 812, each of which forms one halftone dot. The number of cells in the dithering matrix 810 is the same as the number of cells in the dithering matrix 800. However, the thresholds included in the cells 811 and 812 are shifted by one pixel in the sub-scanning direction relative to the cells 801 and 804. A cell growth order 902 indicates the growth order of the cells 811 and 812. A growth center 903 of the cell growth order 900 is shifted upward by one pixel in the sub-scanning direction relatively to the growth center 901 of the cell growth order 900. Since the arrangement of the cells 801, 804, 811, and 812 is similar to that in the dithering matrix 800, the dithering matrix 810 forms halftone dots each having a screen ruling of 141 lpi and an angle of 45 degrees at a resolution of 1,200 dpi.

Figure 11A:
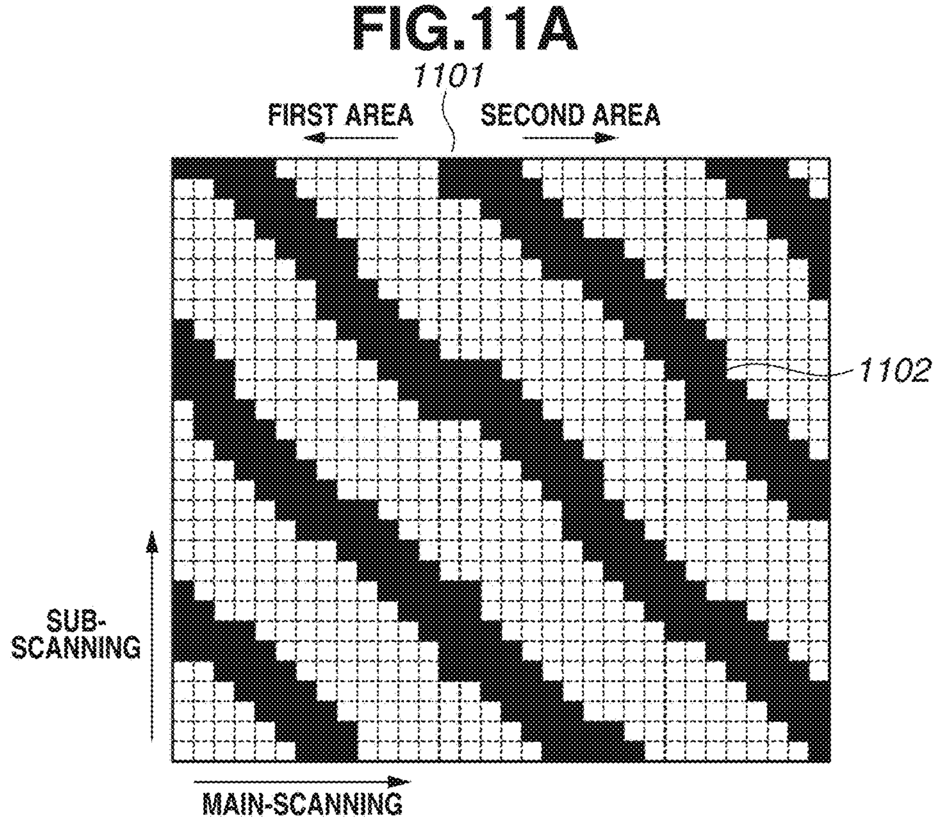
FIGS. 11A, 11B, and 11C each illustrate an example of bitmap data obtained using the dithering matrix according to the first exemplary embodiment.
Figure 11B:
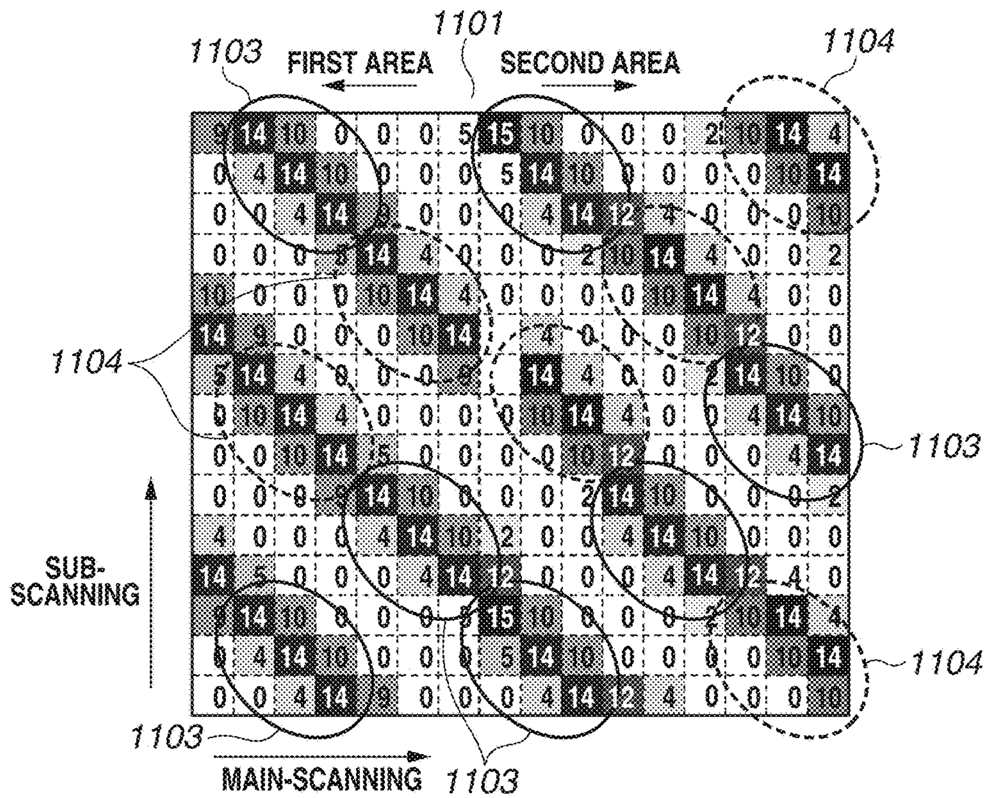
Figure 11C:
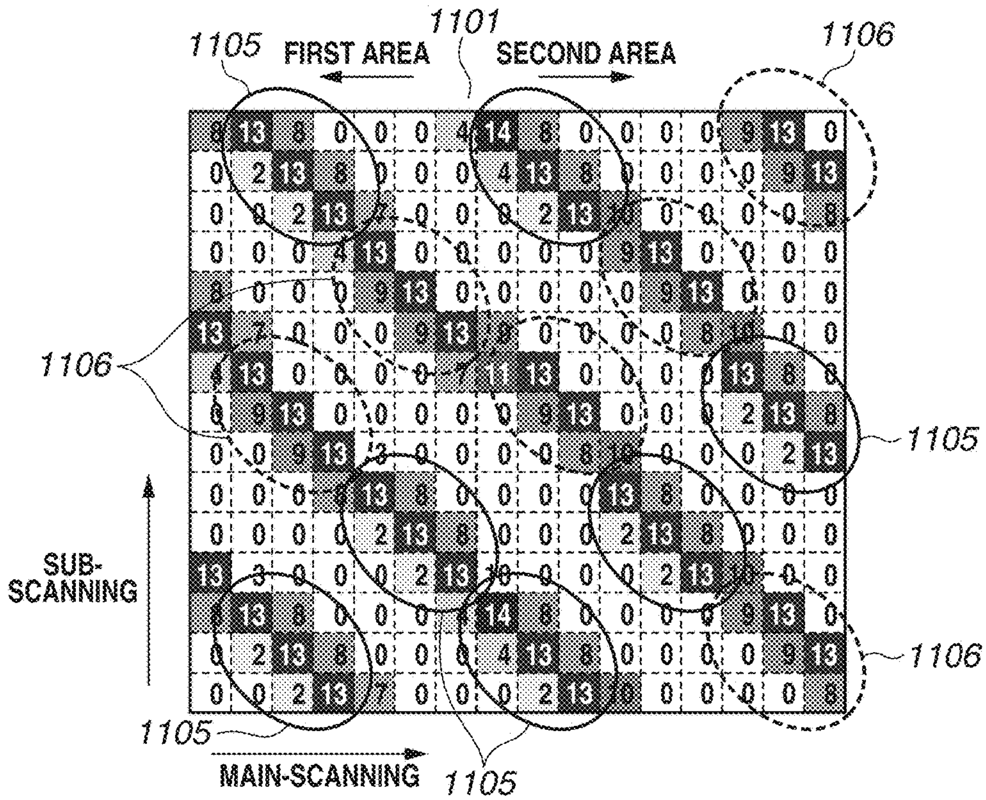

FIG. 11A illustrates binary bitmap data (1,200 dpi) obtained by performing halftone processing on the drawing bitmap in which all input pixel values are 84 by using the dithering matrix 810, and then performing phase transfer processing. In FIG. 11A, location 1101 indicates a transfer point (see the transfer point P3 illustrated in FIG. 5B) at which the line should be shifted by one pixel in the upward direction of the sub-scanning direction. It can be seen that the halftone dot within the second area is shifted by one pixel (one line) in the upward direction of the sub-scanning direction with the transfer point 1101 as a boundary. In the first area and the second area, halftone dots 1102 are connected and ON pixels are arranged in a line shape. As described above, the growth center of the cells 811 and 812 is shifted by one pixel relative to the cells 801 and 804. Accordingly, it can be seen that the halftone dots fluctuate as compared with FIG. 10A. FIG. 11B illustrates multivalued bitmap data (600 dpi) obtained after performing pseudo high-resolution processing on the binary bitmap data (1,200 dpi) obtained after the halftone processing as illustrated in FIG. 11A. In the first area illustrated in FIG. 11B, halftone dots indicated by solid line frames 1103 and halftone dots indicated by broken line frames 1104 are formed. Also, in the second area, halftone dots indicated by the frames 1103 and halftone dots indicated by the frames 1104 are formed. FIG. 11C schematically illustrates halftone dots formed by emitting a laser beam by the laser scanner using the multivalued bitmap data illustrated in FIG. 11B. In the first area illustrated in FIG. 11C, halftone dots indicated by solid line frames 1105 and halftone dots indicated by broken line frames 1106 are formed by using the laser scanner. In the present exemplary embodiment, the cells 811 and 812 whose the growth center is shifted by one pixel in the sub-scanning direction are arranged in the direction of the vector 806. As a result, as illustrated in FIG. 11A, it can be seen that the line on which the ON pixels are arranged in the direction of the vector 805 fluctuates in the direction of the vector 806 as compared with FIG. 10A. Thus, it is possible to form the same halftone dots in the first area and the second area, which are formed on both sides of the transfer point as a boundary, regardless of the responsiveness of the laser scanner. The cells whose growth center is shifted by one pixel in the sub-scanning direction can also be arranged in the direction of the vector 805, or in the direction of the sum of the vectors 805 and 806. In a case where the cells whose growth center is shifted by one pixel in the sub-scanning direction are arranged in the direction of the vector 805, it is possible to suppress fluctuations of halftone dots having a line shape. However, the intervals between halftone dots having a line shape in the direction of the vector 806 may be uneven, and thus considerable attention needs to be paid.

In the present exemplary embodiment, the description has been given of an example of the dithering matrix having a screen ruling of 141 lpi and an angle of 45 degrees at a resolution of 1,200 dpi, and including the first vector having components of 6 in the main-scanning direction and −6 in the sub-scanning direction, and the second vector having components of 6 in the main-scanning direction and 6 in the sub-scanning direction. However, the present disclosure is not limited to this example, as long as the vectors each include an even number of components in the main-scanning direction and the sub-scanning directions. The dithering matrix according to the present exemplary embodiment includes a combination of four cells. However, the configuration of the dithering matrix is not limited to this example. For example, eight or 16 cells may be combined and a half of the cells may be arranged so as to shift the growth center by one pixel in the sub-scanning direction with respect to the remaining half of the cells.

While in the present exemplary embodiment, a configuration has been described as an example in which the phase transfer processing is performed in the sub-scanning direction, the present disclosure is not limited to this configuration. For example, the phase transfer processing may be performed in the main-scanning direction. In this case, the direction in which the growth center of the halftone dots is shifted corresponds to the main-scanning direction that is the same as the direction in which the phase transfer processing is performed.

As described above, in the present exemplary embodiment, the dithering matrix is used in which the cell growth center is shifted by one pixel relatively in the sub-scanning direction in a plurality of cells constituting the dithering matrix forming halftone dots in a line shape. In this way, the same halftone dots can be formed in the first area and the second area, which are formed on both sides of the transfer point as a boundary, regardless of the responsiveness of the laser scanner, and thus the first and second areas can be reproduced with the same density and color.

In the first exemplary embodiment, a case has been described where the halftone processing unit 202 uses the dithering matrix that forms halftone dots in a line shape. In a second exemplary embodiment, a case is described where the halftone processing unit 202 uses a dithering matrix that forms halftone dots in a circular shape. The present exemplary embodiment differs from the first exemplary embodiment only in regard to the configuration of the dithering matrix used by the halftone processing unit 202. Accordingly, portions similar to those in the first exemplary embodiment described above are denoted by the same reference numerals, and only different portions will be described below.

The dithering matrix used in the present exemplary embodiment and advantageous effects of the dithering matrix will be described in detail with reference to FIGS. 12A and 12B, FIGS. 13A and 13B, FIGS. 14A, 14B, and 14C, and FIGS. 15A, 15B, and 15C.

Figure 12A:
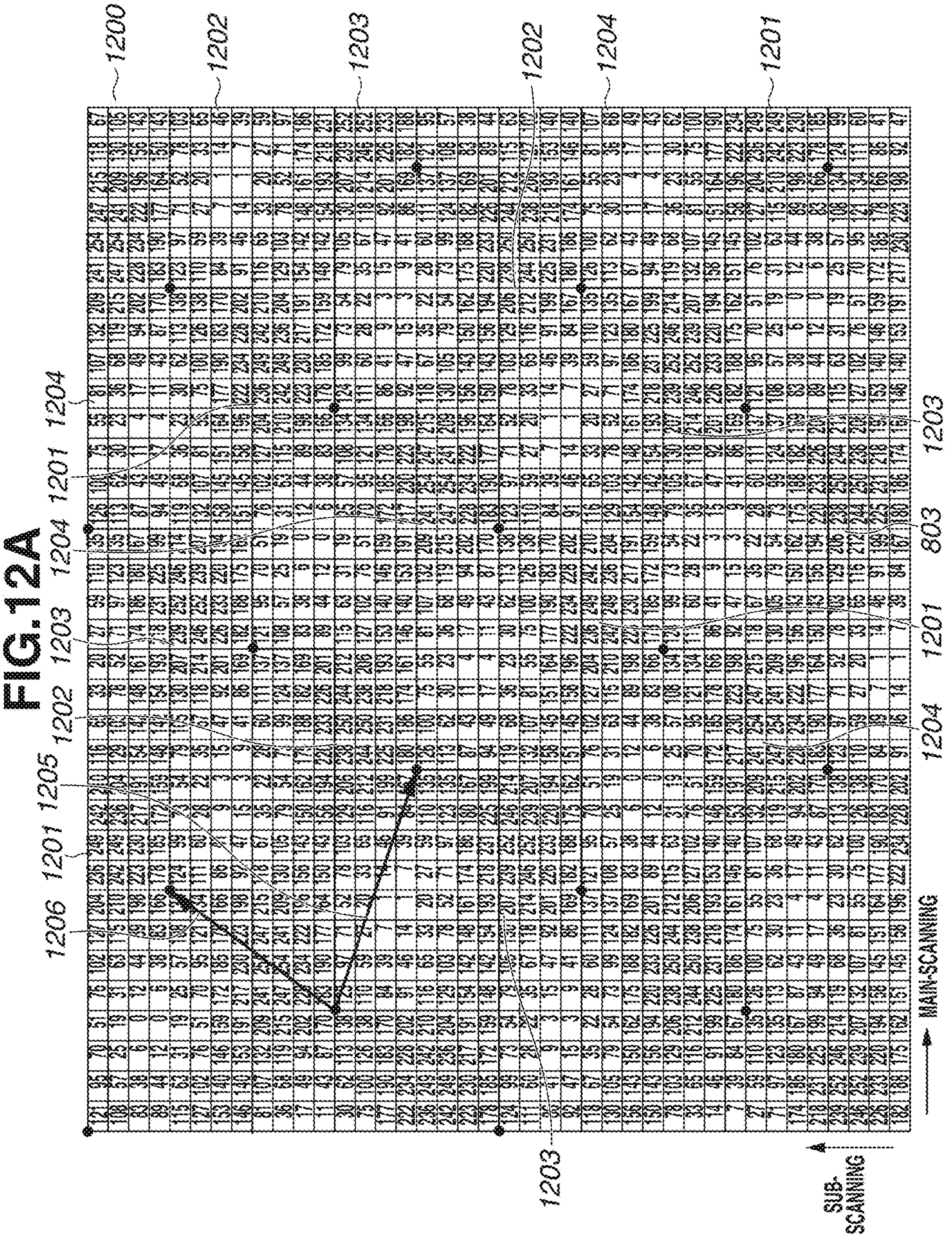
FIGS. 12A and 12B each illustrate an example of a binary dithering matrix according to a second exemplary embodiment.
Figure 12B:
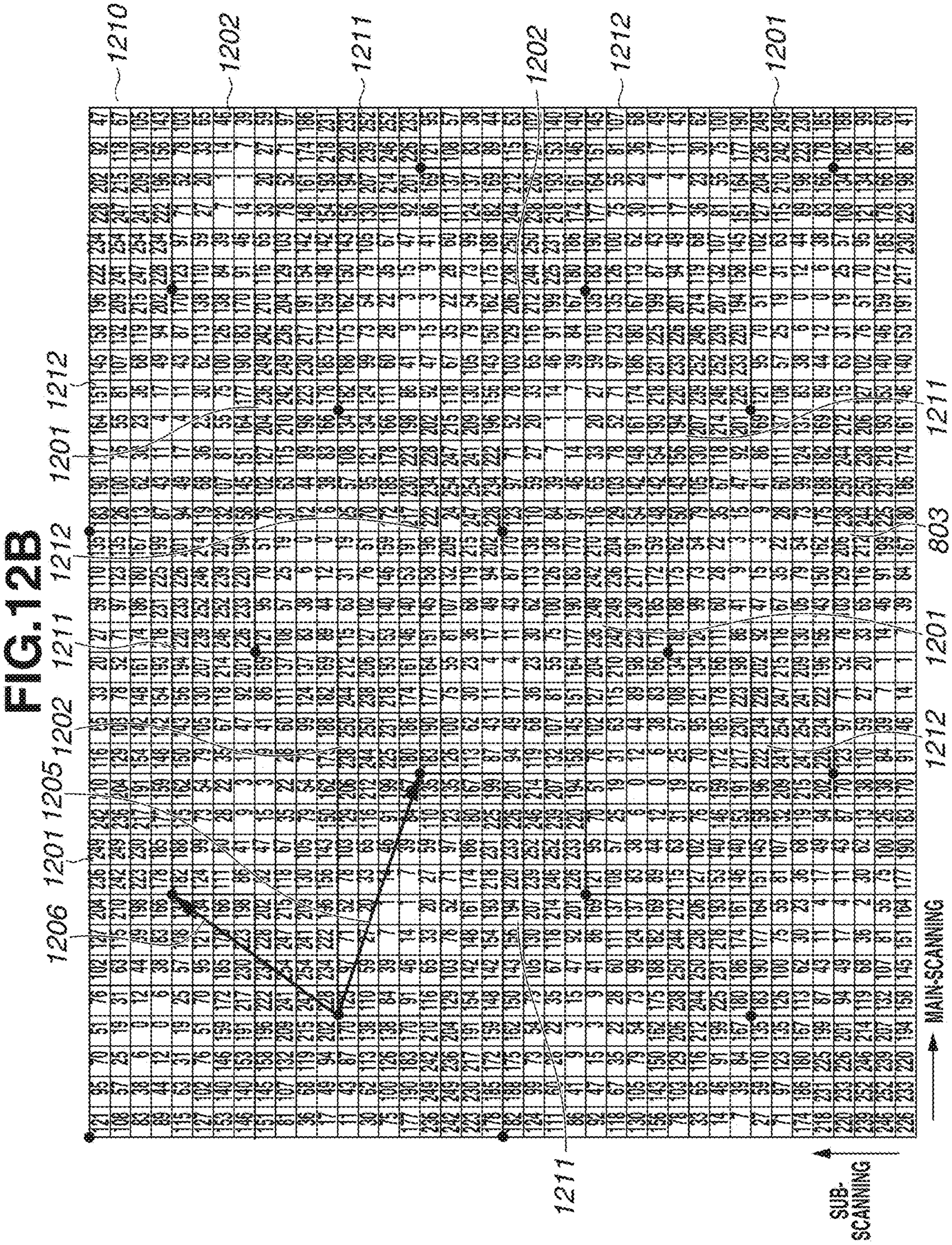

FIGS. 12A and 12B each illustrate an example of the dithering matrix according to the present exemplary embodiment. A dithering matrix 1200 illustrated in FIG. 12A includes four cells 1201, 1202, 1203, and 1204, each of which forms one halftone dot.

FIGS. 13A and 13B each illustrate an example of a growth order of cells constituting the dithering matrix according to the present exemplary embodiment. FIG. 13A illustrates a cell growth order 1300. The cells 1201 to 1204 illustrated in FIG. 12A are each configured to have the same growth order and different thresholds by integral-multiplying the cell growth order 1300 by the total number of cells and then adding different values less than the total number of cells to each cell. For example, in the present exemplary embodiment, the cell growth order 1300 has a value ranging from 0 to 39. The thresholds of the cells 1201 to 1204 are each obtained by multiplying the cell growth order 1300 by 4, and adding 0 to the cell 1201, adding 1 to the cell 1202, adding 2 to the cell 1203, and adding 3 to the cell 1204. The threshold included in the cell 1201 ranges from 0 to 156. The threshold included in the cell 1202 ranges from 1 to 157. The threshold included in the cell 1203 ranges from 2 to 158. The threshold included in the cell 1204 ranges from 3 to 159. The value of each threshold is obtained by normalizing a value less than a maximum input pixel value based on the input pixel value of image data input to the halftone processing unit 202. In the present exemplary embodiment, the maximum input pixel value of the image data input to the halftone processing unit 202 is 255, and thus the threshold is normalized to a value ranging from 0 to 254. As a result, the cells 1201 to 1204 include the maximum threshold 159 before normalization. Accordingly, after the normalization, the cell 1201 includes a threshold ranging from 0 to 249, the cell 1202 includes a threshold ranging from 1 to 250, the cell 1203 includes a threshold ranging from 3 to 252, and the cell 1204 includes a threshold ranging from 4 to 254. A halftone dot cycle according to the present exemplary embodiment can be represented by two vectors. A first vector 1205 has components of 8 in the main-scanning direction and −4 in the sub-scanning direction. A second vector 1206 has components of 4 in the main-scanning direction and 8 in the sub-scanning direction. The length of each of the two vectors is about 8.49. The dithering matrix 1200 represented by the two vectors forms halftone dots each having a screen ruling of 134 lpi and an angle of 27 degrees at a resolution of 1,200 dpi. In the cell growth order 1300, the same growth orders are set point-symmetrically to a growth center 1301 which corresponds to the center of two pixels in the sub-scanning direction.

Figure 14A:
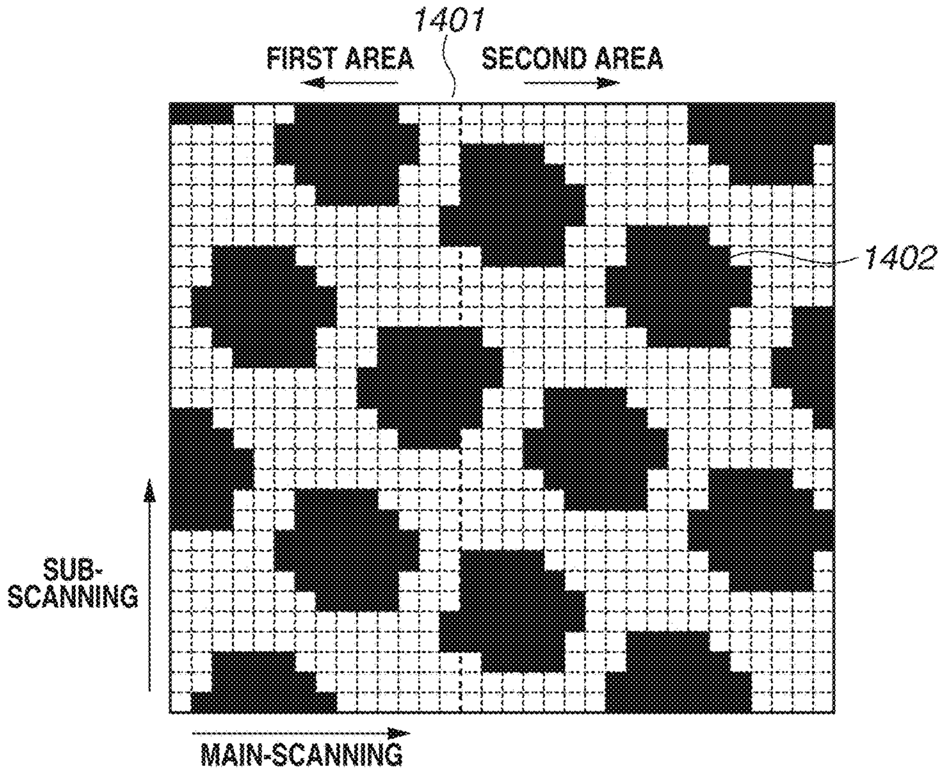
FIGS. 14A, 14B, and 14C each illustrate an example of bitmap data obtained using the dithering matrix according to the second exemplary embodiment.
Figure 14B:
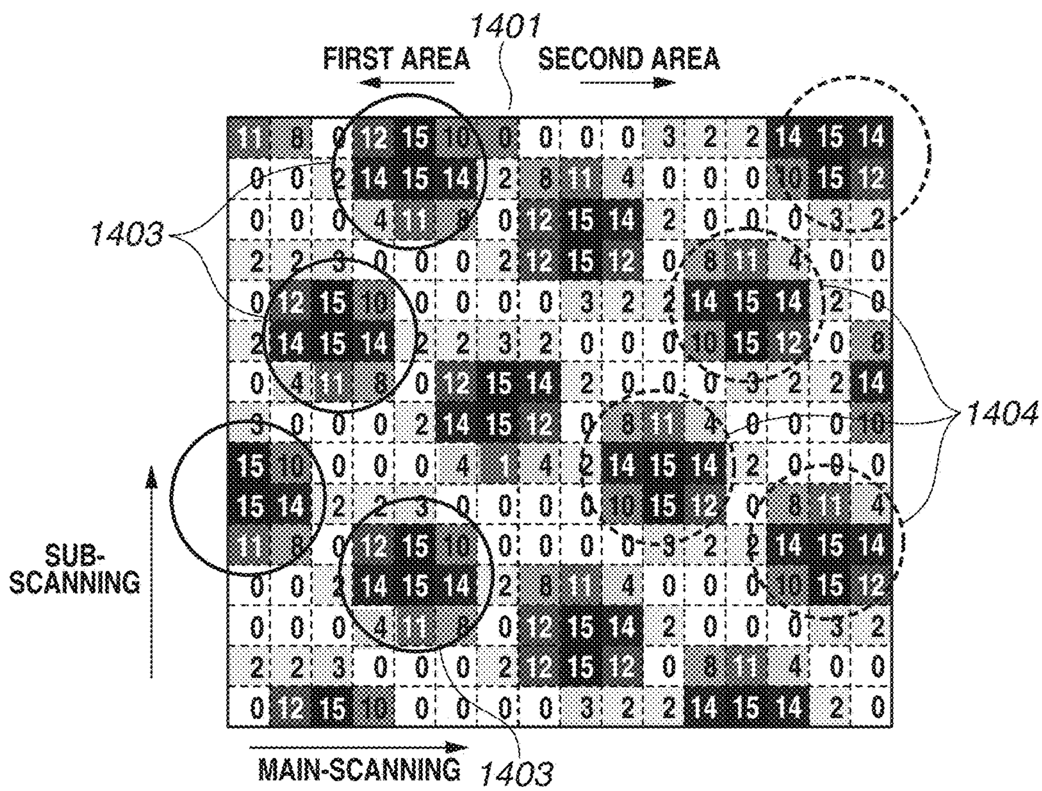
Figure 14C:
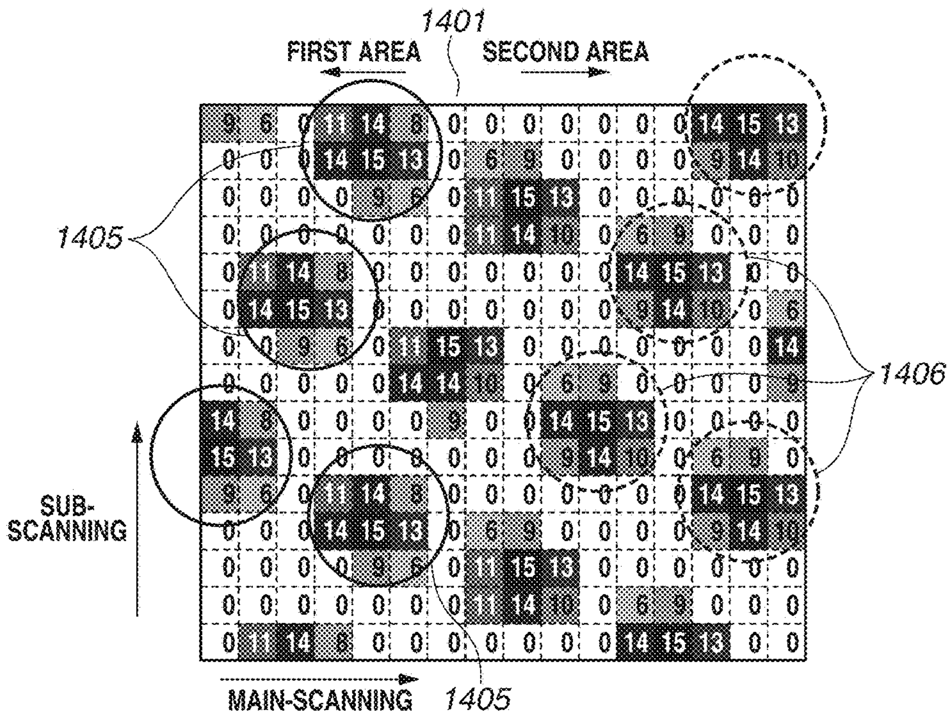

FIGS. 14A, 14B, and 14C each illustrate an example of halftone dots formed using the dithering matrix illustrated in FIG. 12A. FIG. 14A illustrates binary bitmap data (1,200 dpi) obtained by performing halftone processing on the drawing bitmap in which all input pixel values are 100 by using the dithering matrix 1200, and then performing phase transfer processing. In FIG. 14A, a broken line 1401 indicates a transfer point (see the transfer point P3 illustrated in FIG. 5B) at which the line should be shifted by one pixel in the upward direction of the sub-scanning direction. It can be seen that the halftone dot within the second area is shifted by one pixel (one line) in the upward direction of the sub-scanning direction with the transfer point 1401 as a boundary. In the first area and the second area, a plurality of halftone dots 1402 in which ON pixels are arranged in a circular shape is present. The halftone dots 1402 are formed in the direction of the vectors 1205 and 1206. As the input pixel value increases, the area ratio is increased so as to increase the area of the shape in a circular shape with the growth center 1301 as a center, thereby allowing the halftone dots to grow. FIG. 14B illustrates multivalued bitmap data (600 dpi) obtained after performing pseudo high-resolution processing on the binary bitmap data (1,200 dpi) obtained after the phase transfer processing as illustrated in FIG. 14A. In the first area illustrated in FIG. 14B, halftone dots indicated by solid line frames 1403 are formed. In the second area illustrated in FIG. 14B, halftone dots indicated by broken line frames 1404 are formed. The halftone dots in the first area and the second area illustrated in FIG. 14B are formed in a point symmetrical manner, while the total number of halftone dots in the first area is the same as that in the second area. FIG. 14C schematically illustrates halftone dots formed by emitting a laser beam by the laser scanner using the multivalued bitmap data illustrated in FIG. 14B. In the first area illustrated in FIG. 14C, halftone dots indicated by solid line frames 1405 are formed by using the laser scanner. In the second area illustrated in FIG. 14C, halftone dots indicated by broken line frames 1406 are formed by using the laser scanner. As illustrated in FIG. 14C, it can be seen that, in a case of using the dithering matrix 1200, the sum of halftone dots formed on a recording medium by using the laser scanner in the first area may be different from that in the second area. In this way, in the above-described situation, on a recording medium, different halftone dots are formed in the first area and the second area, which are formed on both sides of the transfer point as a boundary, and the first and second areas are reproduced with different densities and colors.

A dithering matrix 1210 illustrated in FIG. 12B includes four cells 1201, 1202, 1211, and 1212, each of which forms one halftone dot. The number of cells in the dithering matrix 1210 is the same as the number of cells in the dithering matrix 1200. However, the thresholds included in the cells 1211 and 1212 are shifted by one pixel in the sub-scanning direction relative to the cells 1201 and 1202. A cell growth order 1302 indicates the growth order of the cells 1211 and 1212. It can be seen that a growth center 1303 of the cell growth order 1302 is shifted downward by one pixel in the sub-scanning direction with respect to the growth center 1301 of the cell growth order 1300. Since the arrangement of the cells 1201, 1202, 1211, and 1212 is similar to that in the dithering matrix 1200, the dithering matrix 1210 forms halftone dots each having a screen ruling of 134 lpi and an angle of 27 degrees at a resolution of 1,200 dpi.

Figure 15A:
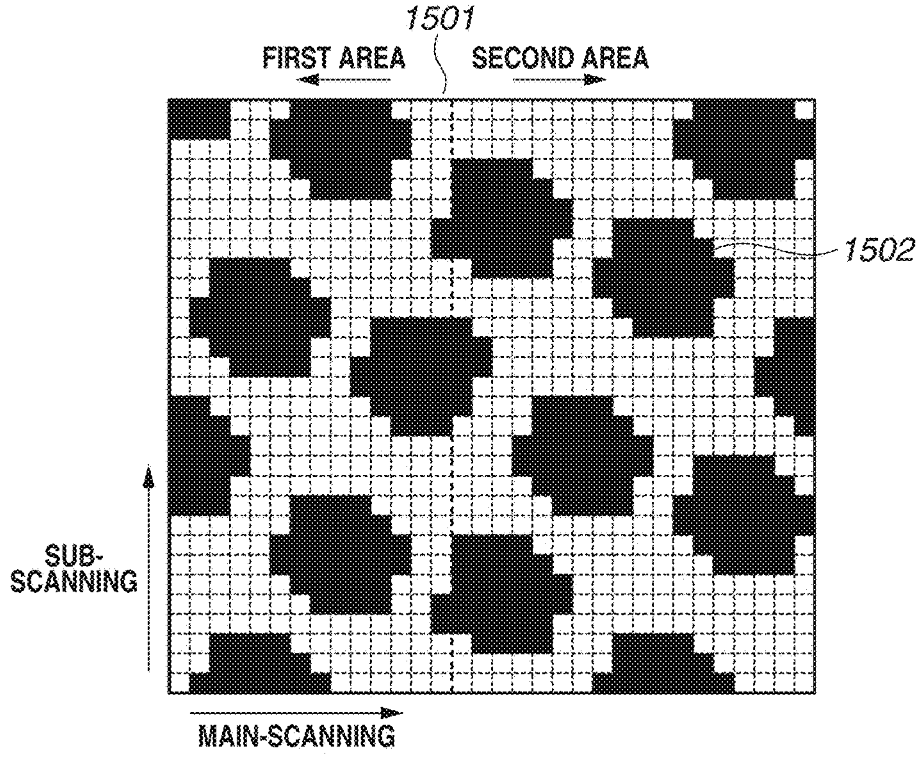
FIGS. 15A, 15B, and 15C each illustrate bitmap data obtained using the dithering matrix according to the second exemplary embodiment.
Figure 15B:
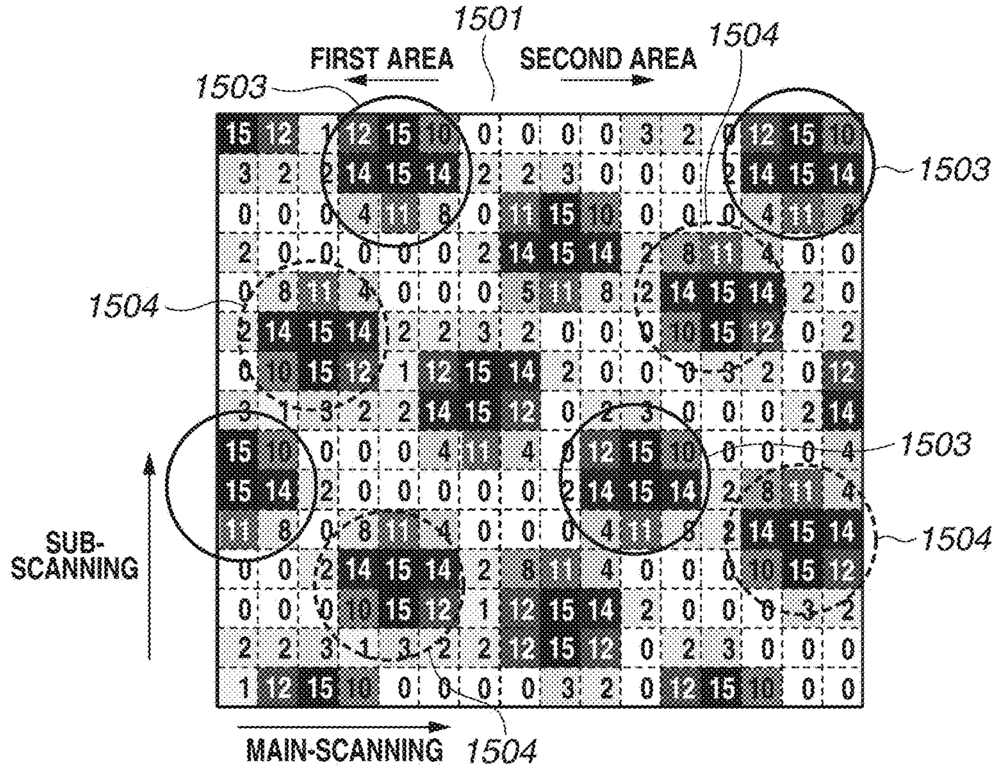
Figure 15C:
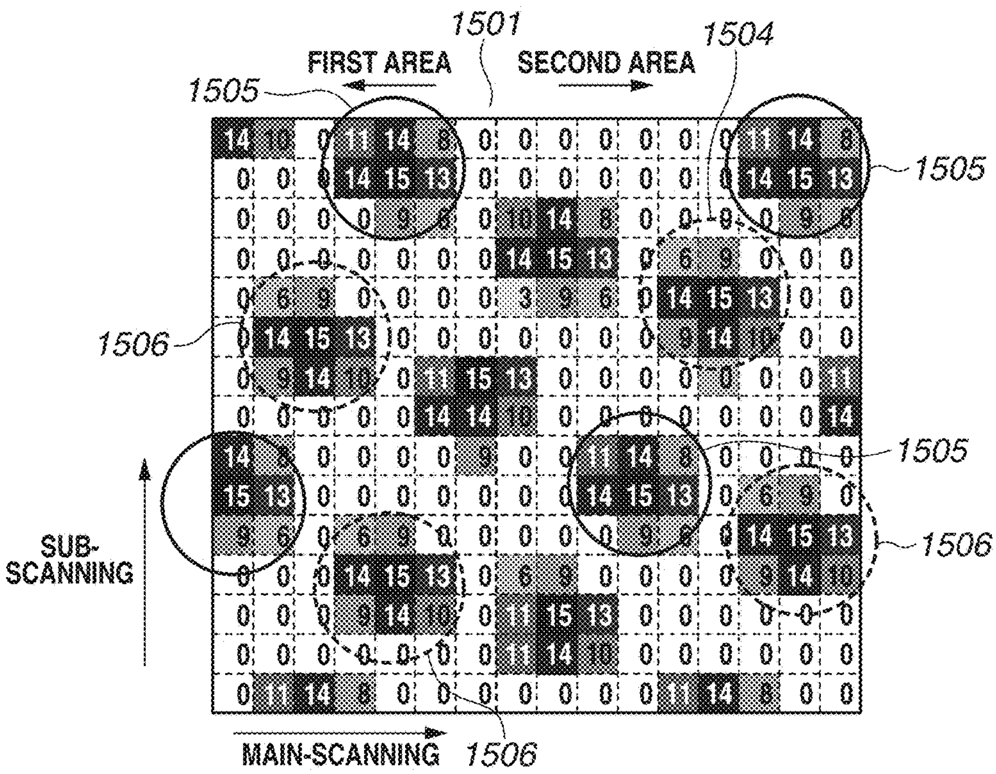

FIG. 15A illustrates binary bitmap data (1,200 dpi) obtained by performing halftone processing on the drawing bitmap in which all input pixel values are 100 by using the dithering matrix 1210, and then performing phase transfer processing. In FIG. 15A, a broken line 1501 indicates a transfer point (see the transfer point P3 illustrated in FIG. 5B) at which the line should be shifted by one pixel in the upward direction of the sub-scanning direction. It can be seen that the halftone dot within the second area is shifted by one pixel (one line) in the upward direction of the sub-scanning direction with the transfer point 1501 as a boundary. In the first area and the second area, halftone dots 1502 in which ON pixels are arranged in a circular shape are present. However, as described above, the growth center of the cells 1211 and 1212 is shifted by one pixel relative to the cells 1201 and 1202. Therefore, it can be seen that halftone dots fluctuate as compared with FIG. 14A. FIG. 15B illustrates multivalued bitmap data (600 dpi) obtained after performing pseudo high-resolution processing on the binary bitmap data (1,200 dpi) obtained after the phase transfer processing as illustrated in FIG. 15A. In the first area illustrated in FIG. 15B, halftone dots indicated by solid line frames 1503 and halftone dots indicated by broken line frames 1504 are formed. Also, in the second area, halftone dots indicated by the frames 1503 and halftone dots indicated by the frames 1504 are formed. FIG. 15C schematically illustrates halftone dots formed by emitting a laser beam by the laser scanner using the multivalued bitmap data illustrated in FIG. 15B. In the first area illustrated in FIG. 15C, halftone dots indicated by solid line frames 1505 and halftone dots indicated by broken line frames 1506 are formed by using the laser scanner. In the present exemplary embodiment, the cells 1211 and 1212 whose the growth center is shifted by one pixel in the sub-scanning direction are arranged in the direction of the sum of the vectors 1205 and 1206. As a result, as illustrated in FIG. 15A, the halftone dots located in the direction of the sum of the vectors 1205 and 1206 fluctuate in a staggered manner as compared with FIG. 14A. With this configuration, it is possible to form the same halftone dots in the first area and the second area, which are formed on both sides of the transfer point as a boundary, regardless of the responsiveness of the laser scanner.

The cells whose growth center is shifted by one pixel in the sub-scanning direction can also be arranged in the direction of the vector 1205, or in the direction of the vector 1206.

Also, in the present exemplary embodiment, the combination of the first vector and the second vector is not limited, as long as the vectors each include an even number of components in the main-scanning direction and the sub-scanning directions. While the dithering matrix according to the present exemplary embodiment includes a combination of four cells, the configuration of the dithering matrix is not limited to this example. For example, 8 or 16 cells may be combined and a half of the cells may be arranged so as to shift the growth center by one pixel in the sub-scanning direction with respect to the remaining half of the cells.

While in the present exemplary embodiment, the description has been given of a configuration in which the phase transfer processing is performed in the sub-scanning direction, the present disclosure is not limited to this configuration. For example, the phase transfer processing may be performed in the main-scanning direction. In this case, the direction in which the growth center of the halftone dots is shifted corresponds to the main-scanning direction that is the same as the direction in which the phase transfer processing is performed.

In the present exemplary embodiment, the dithering matrix used by the halftone processing unit 202 is a dithering matrix that forms halftone dots in a circular shape. However, there is no need to use the dithering matrix forming halftone dots in a circular shape for all attributes and all color screens. For example, a dithering matrix forming halftone dots in a circular shape may be used as the low screen ruling dithering matrix, and a dithering matrix forming halftone dots in a line shape may be used as the high screen ruling dithering matrix. Further, for example, the dithering matrix used for each color screen converted into CMYK color space may be changed and combined with other matrices by using, for example, cyan for the dithering matrix according to the second exemplary embodiment and magenta for the dithering matrix according to first exemplary embodiment.

As described above, in the present exemplary embodiment, the dithering matrix is used in which the cell growth center is shifted by one pixel relatively in the sub-scanning direction in a plurality of cells constituting the dithering matrix forming halftone dots in a circular shape. Consequently, the same halftone dots can be formed in the first area and the second area, which are formed on both sides of the transfer point as a boundary, regardless of the responsiveness of the laser scanner, and thus the first and second areas can be reproduced with the same density and color.

In the first and second exemplary embodiments, a case is described where the halftone processing unit 202 uses the dithering matrix in which the components of the first and second vectors are a combination of even numbers. In a third exemplary embodiment, a case is described where a dithering matrix in which the components of the first and second vectors are a combination of odd numbers is used. The third exemplary embodiment differs from the first and second exemplary embodiments only in regard to the configuration of the dithering matrix used by the halftone processing unit 202. Accordingly, portions similar to those in the first and second exemplary embodiment described above are denoted by the same reference numerals, and only different portions will be described below.

The dithering matrix used in the present exemplary embodiment and advantageous effects of the dithering matrix will be described in detail with reference to FIGS. 16A and 16B, FIGS. 17A and 17B, FIGS. 18A, 18B, and 18C, and FIGS. 19A, 19B, and 19C.

Figure 16A:
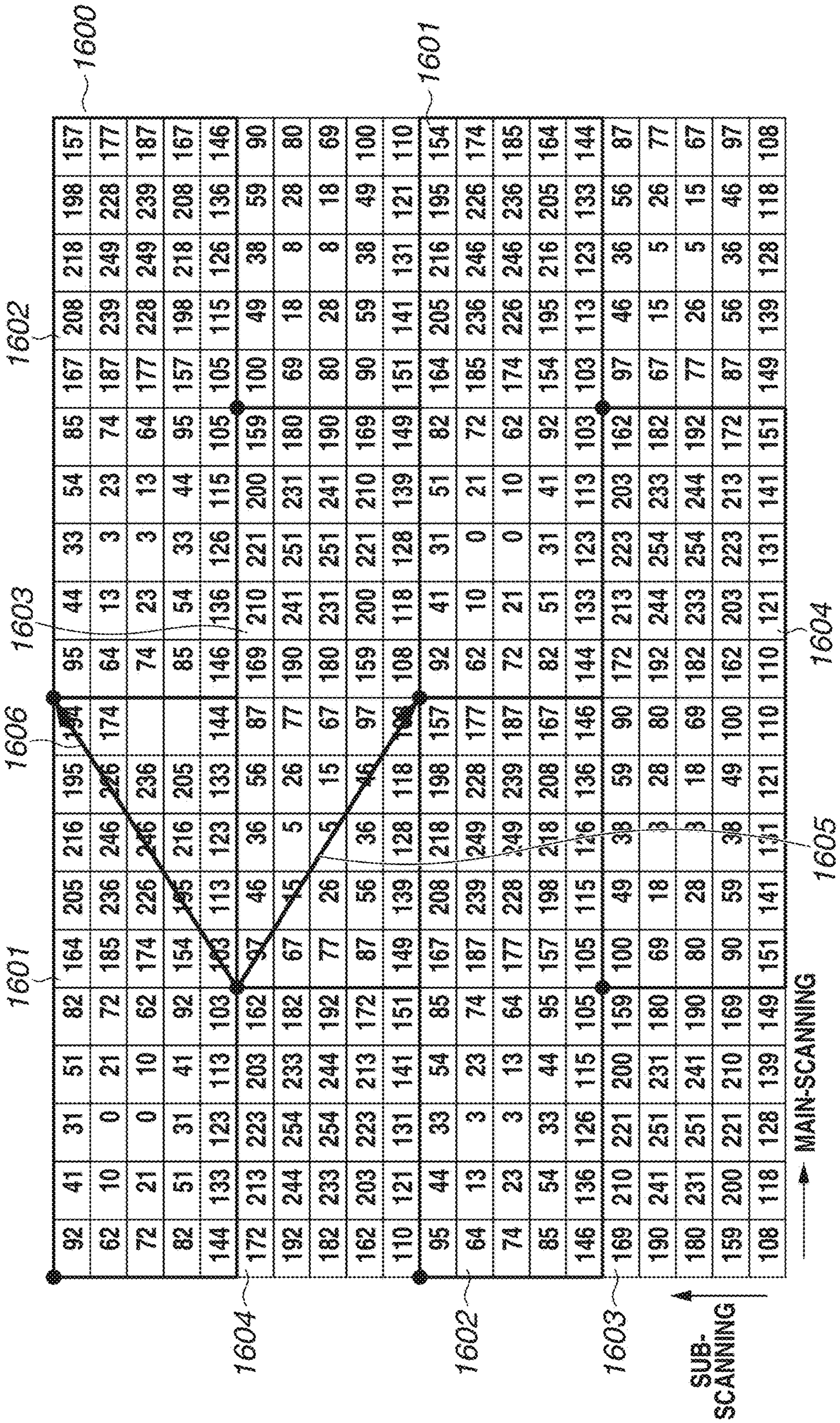
FIGS. 16A and 16B illustrate an example of a binary dithering matrix according to a third exemplary embodiment.
Figure 16B:
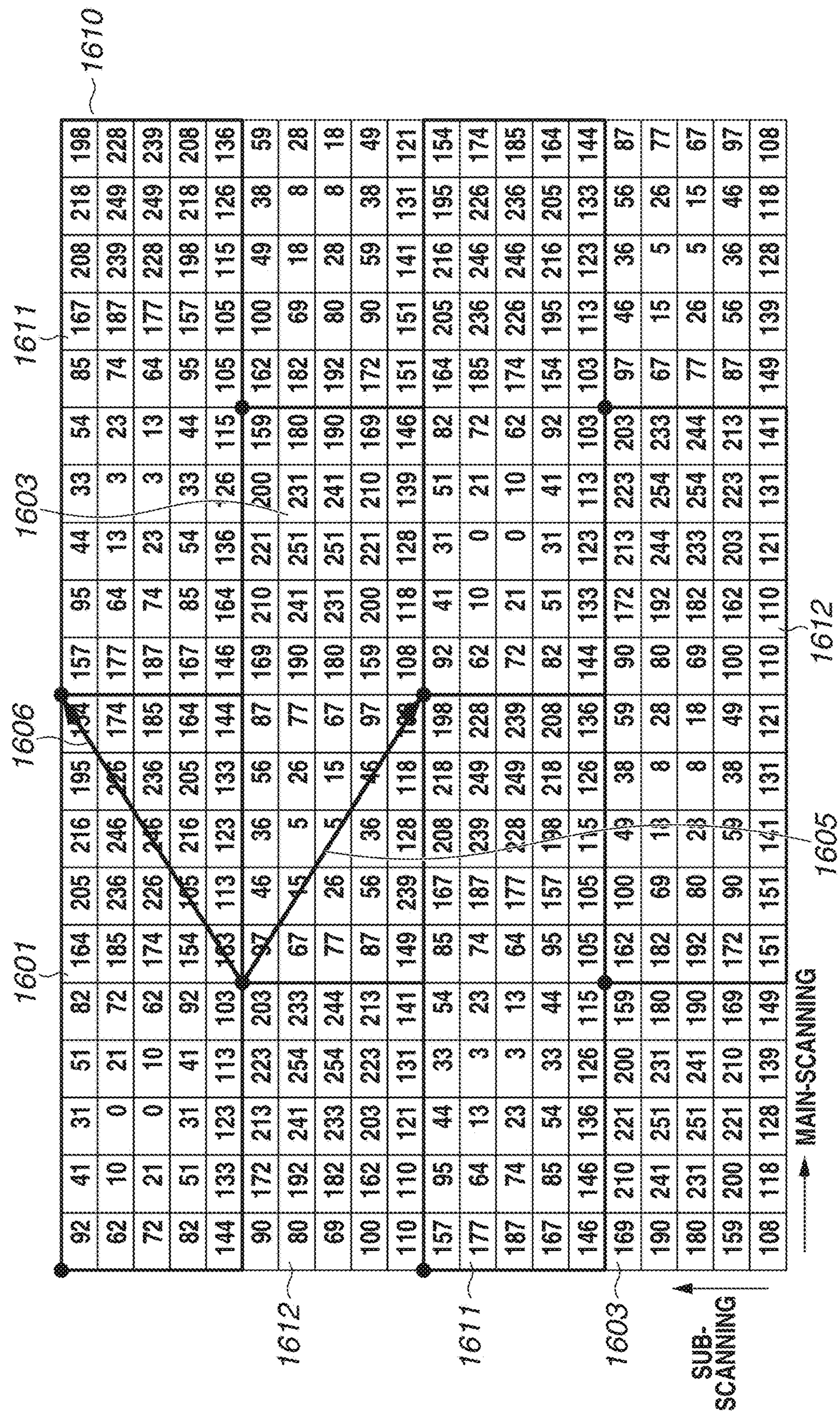

FIGS. 16A and 16B each illustrate an example of the dithering matrix according to the present exemplary embodiment. A dithering matrix 1600 illustrated in FIG. 16A includes four cells 1601, 1602, 1603, and 1604, each of which forms one halftone dot.

Figure 17A:
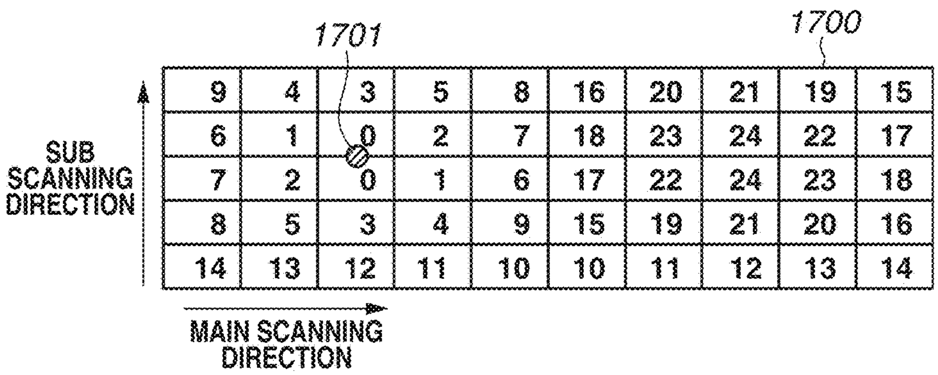
FIGS. 17A and 17B each illustrate an example of a cell growth order according to the third exemplary embodiment.
Figure 17B:
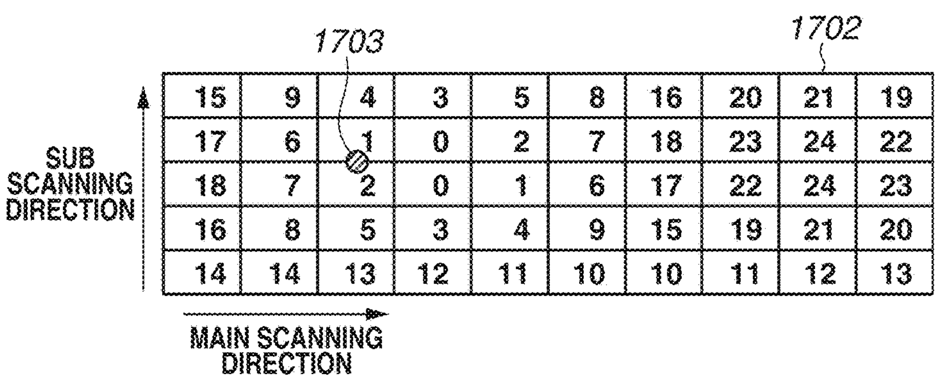

FIGS. 17A and 17B each illustrate an example of a growth order of cells constituting the dithering matrix according to the present exemplary embodiment. FIG. 17A illustrates a cell growth order 1700. The cells 1601 to 1604 illustrated in FIG. 16A are each configured to have the same growth order and different thresholds by integral-multiplying the cell growth order 1700 by the total number of cells and then adding different values less than the total number of cells to each cell. For example, in the present exemplary embodiment, the cell growth order 1700 has a value ranging from 0 to 24. The thresholds of the cells 1601 to 1604 are each obtained by multiplying the cell growth order 1700 by 4, and adding 0 to the cell 1601, adding 1 to the cell 1602, adding 2 to the cell 1603, and adding 3 to the cell 1604. The threshold included in the cell 1601 ranges from 0 to 96. The threshold included in the cell 1602 ranges from 1 to 97. The threshold included in the cell 1603 ranges from 2 to 98. The threshold included in the cell 1604 ranges from 3 to 99. The value of each threshold is obtained by normalizing a value less than a maximum input pixel value based on the input pixel value of image data input to the halftone processing unit 202 is used. In the present exemplary embodiment, the maximum input pixel value of the image data input to the halftone processing unit 202 is 255, and thus the threshold is normalized to a value ranging from 0 to 254. Thus, the cells 1601 to 1604 include the maximum threshold 99 before normalization. Accordingly, after the normalization, the cell 1601 includes a threshold ranging from 0 to 246, the cell 1602 includes a threshold ranging from 3 to 249, the cell 1603 includes a threshold ranging from 5 to 251, and the cell 1604 includes a threshold ranging from 8 to 254. A halftone dot cycle according to the present exemplary embodiment can be represented by two vectors. A first vector 1605 has components of 5 in the main-scanning direction and −5 in the sub-scanning direction. A second vector 1606 has components of 5 in the main-scanning direction and 5 in the sub-scanning direction. The length of each of the two vectors is about 7.07. The dithering matrix 1600 represented by the two vectors forms halftone dots each having a screen ruling of 170 lpi and an angle of 45 degrees at a resolution of 1,200 dpi. In the cell growth order 1700, the same growth orders are set point symmetrically to a growth center 1701 which corresponds to the center of two pixels in the sub-scanning direction.

Figure 18A:
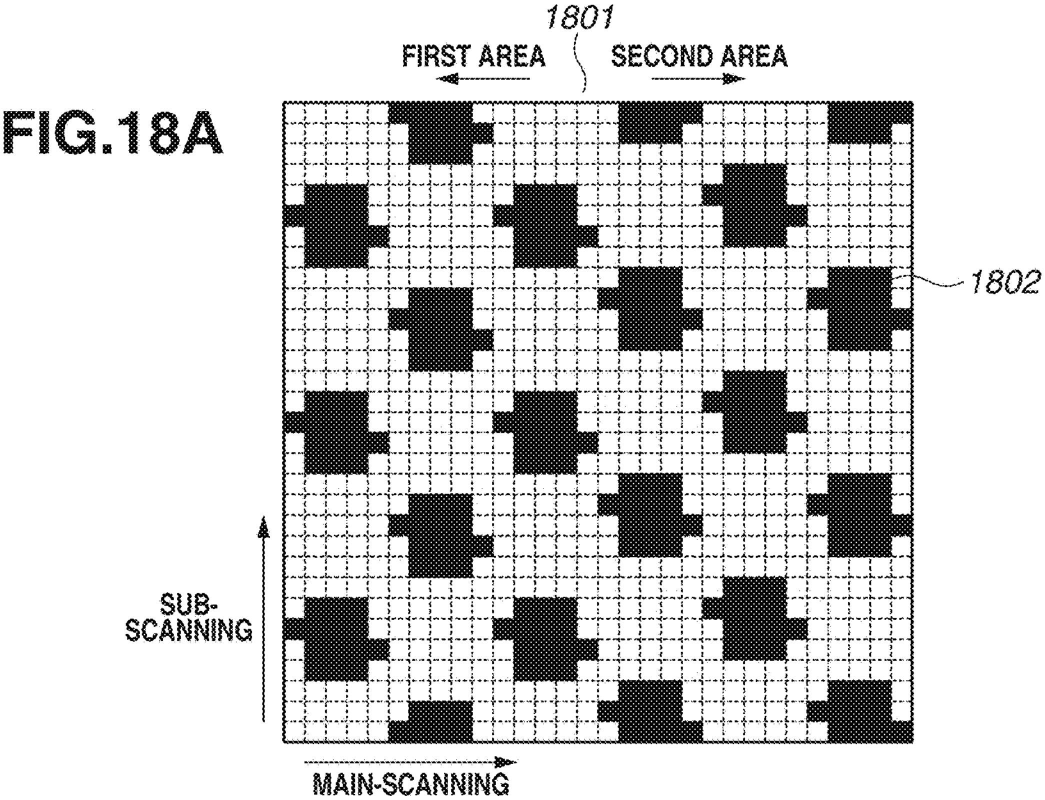
FIGS. 18A, 18B, and 18C each illustrate an example of bitmap data obtained using the dithering matrix according to the third exemplary embodiment.
Figure 18B:
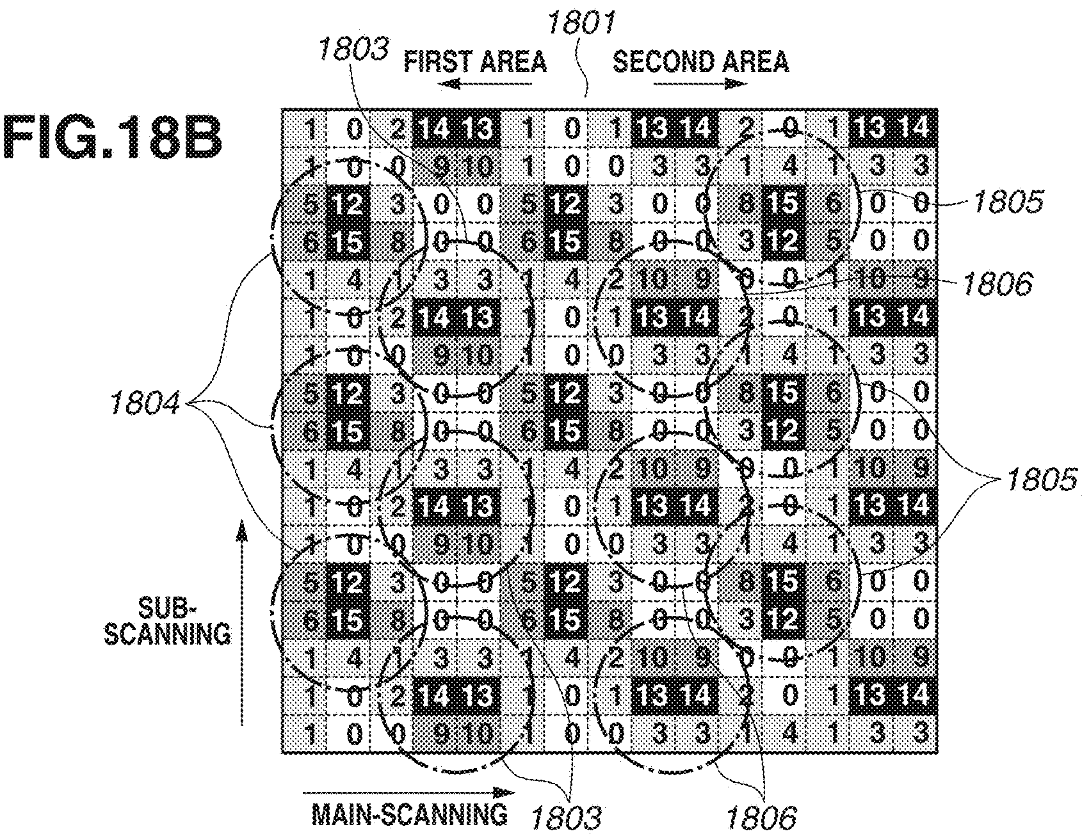
Figure 18C:
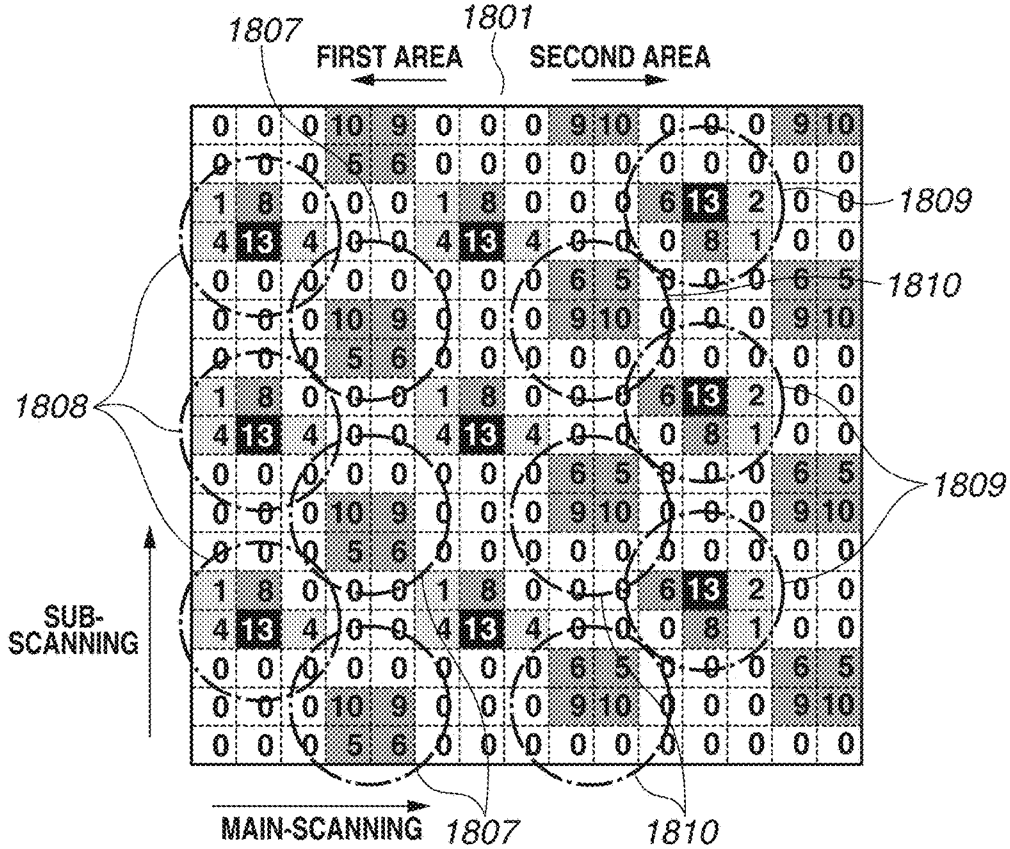

FIGS. 18A, 18B, and 18C each illustrate an example of halftone dots formed using the dithering matrix illustrated in FIG. 16A. FIG. 18A illustrates binary bitmap data (1,200 dpi) obtained by performing halftone processing on the drawing bitmap in which all input pixel values are 70 by using the dithering matrix 1600, and then performing phase transfer processing. In FIG. 18A, a broken line 1801 indicates a transfer point (see the transfer point P3 illustrated in FIG. 5B) at which the line should be shifted by one pixel in the upward direction of the sub-scanning direction. It can be seen that the halftone dot within the second area is shifted by one pixel (one line) in the upward direction of the sub-scanning direction with the transfer point 1801 as a boundary. In the first area and the second area, a plurality of halftone dots 1802 in which ON pixels are arranged in a circular shape is present. The halftone dots 1802 are formed in the direction of the vectors 1605 and 1606. As the input pixel value increases, the area ratio is increased so as to increase the area of the shape in a circular shape with the growth center 1701 as a center, thereby allowing the halftone dots to grow. FIG. 18B illustrates multivalued bitmap data (600 dpi) obtained after performing pseudo high-resolution processing on the binary bitmap data (1,200 dpi) obtained after the phase transfer processing as illustrated in FIG. 18A. In the first area illustrated in FIG. 18B, halftone dots indicated by solid line frames 1803 and halftone dots indicated by dashed-dotted line frames 1804 are formed. In the second area illustrated in FIG. 18B, halftone dots indicated by broken line frames 1805 and halftone dots indicated by dashed-two dotted line frames 1806 are formed. The halftone dots in the first area and the second area illustrated in FIG. 18B are formed in a point symmetrical manner, while the total number of halftone dots in the first area is the same as that in the second area. FIG. 18C schematically illustrates halftone dots formed by emitting a laser beam by the laser scanner using the bitmap data illustrated in FIG. 18B. In the first area illustrated in FIG. 18C, halftone dots indicated by solid line frames 1807 and halftone dots indicated by dashed-dotted line frames 1808 are formed by using the laser scanner. In the second area illustrated in FIG. 18C, halftone dots indicated by broken line frames 1809 and halftone dots indicated by dashed-two dotted line frames 1810 are formed by using the laser scanner. As illustrated in FIG. 18C, in a case of using the dithering matrix 1600, halftone dots formed on a recording medium through the laser scanner in the first area may be different from those in the second area. In other words, in the above-described situation, on a recording medium, different halftone dots are formed in the first area and the second area, which are formed on both sides of the transfer point as a boundary, and the first and second areas are reproduced with different densities and colors.

A dithering matrix 1610 illustrated in FIG. 16B includes four cells 1601, 1603, 1611, and 1612, each of which forms one halftone dot. The number of cells in the dithering matrix 1610 is the same as the number of cells in the dithering matrix 1600. However, the thresholds included in the cells 1611 and 1612 are shifted by one pixel in the main-scanning direction relative to the cells 1601 and 1603. A cell growth order 1702 indicates the growth order of the cells 1611 and 1612. It can be seen that a growth center 1703 of the cell growth order 1702 is shifted rightward by one pixel in the main-scanning direction with respect to the growth center 1701 of the cell growth order 1700. Since the arrangement of the cells 1601, 1603, 1611, and 1612 is similar to that in the dithering matrix 1600, the dithering matrix 1610 forms halftone dots each having a screen ruling of 170 lpi and an angle of 45 degrees at a resolution of 1,200 dpi.

Figure 19A:
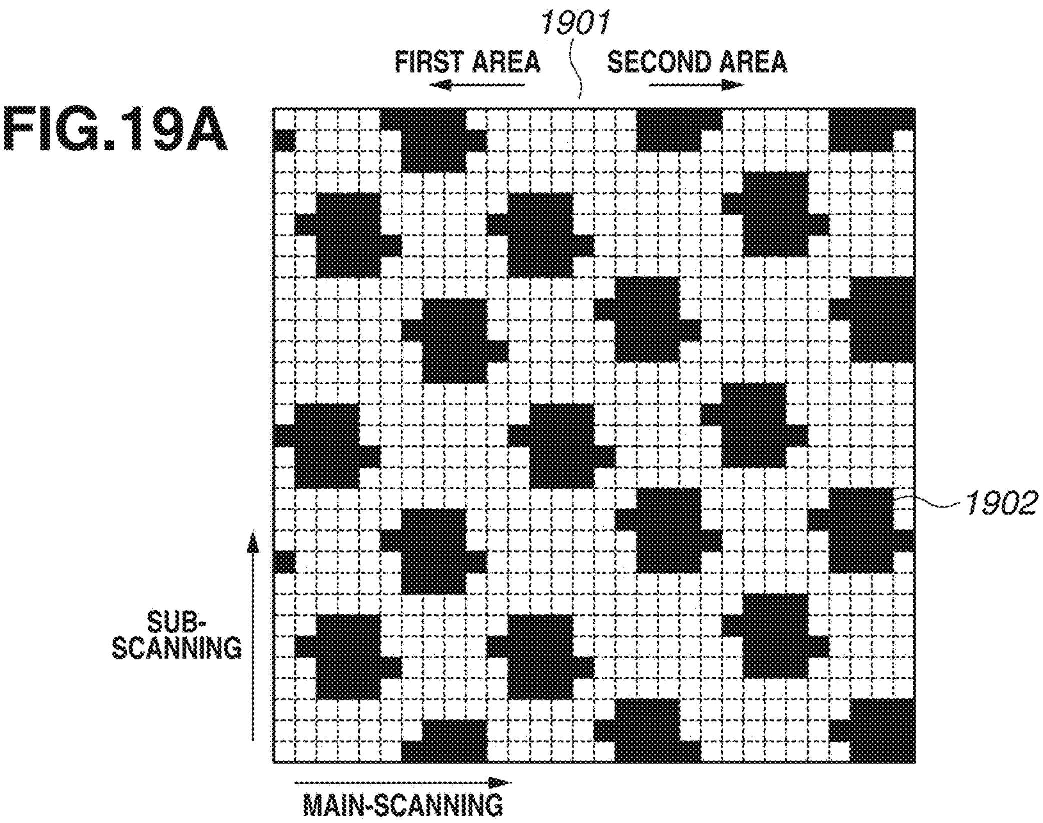
FIGS. 19A, 19B, and 19C each illustrate bitmap data obtained using the dithering matrix according to the third exemplary embodiment.
Figure 19B:
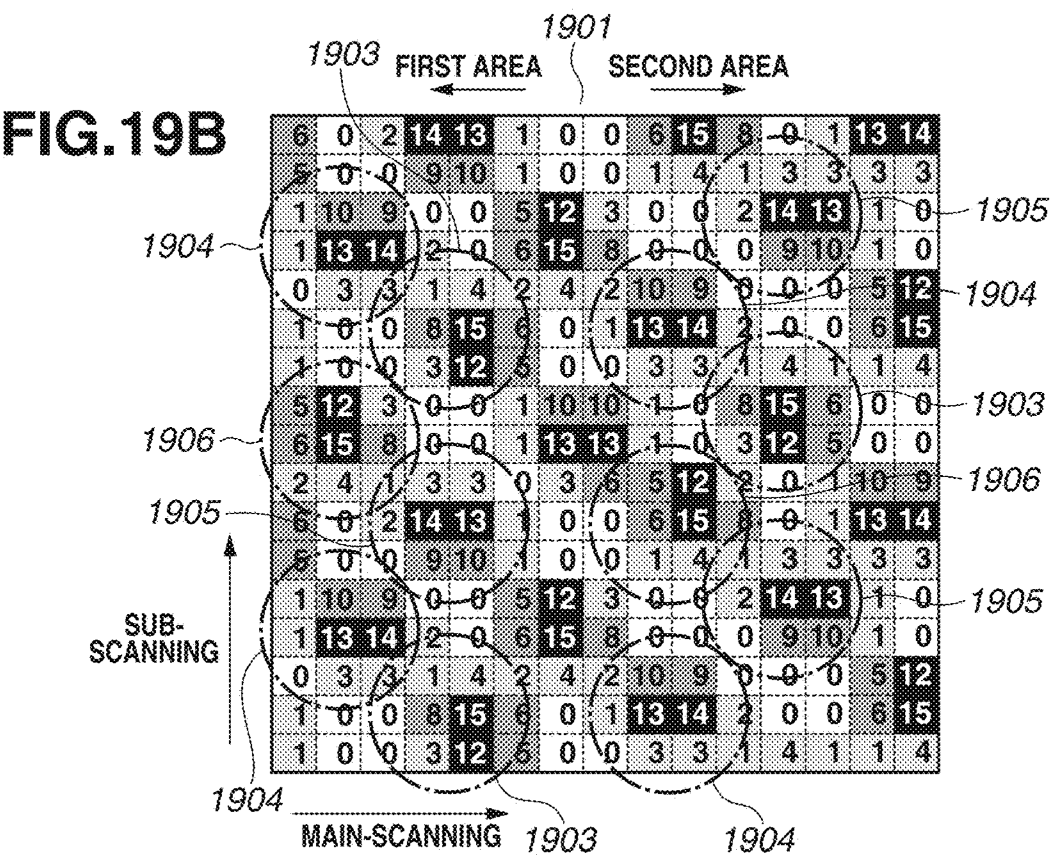
Figure 19C:
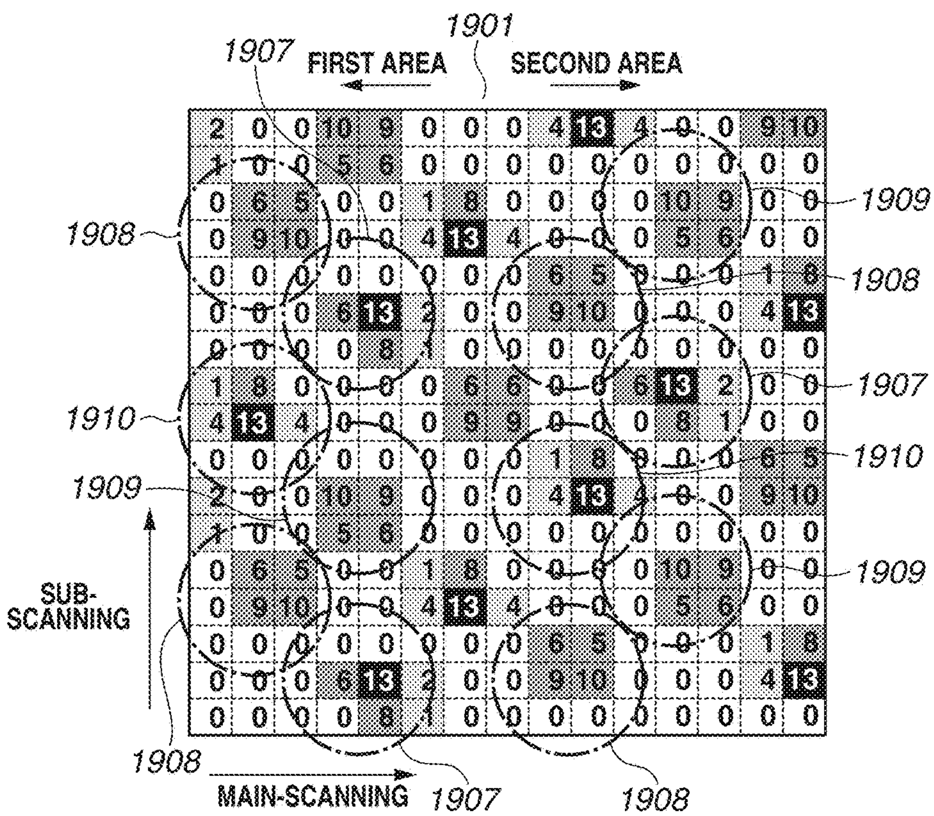

FIG. 19A illustrates binary bitmap data (1,200 dpi) obtained by performing halftone processing on the drawing bitmap in which all input pixel values are 70 by using the dithering matrix 1610, and then performing phase transfer processing. In FIG. 19A, a broken line 1901 indicates a transfer point (see the transfer point P3 illustrated in FIG. 5B) at which the line should be shifted by one pixel in the upward direction of the sub-scanning direction. It can be seen that the halftone dot within the second area is shifted by one pixel (one line) in the upward direction of the sub-scanning direction with the transfer point 1901 as a boundary. In the first area and the second area, a plurality of halftone dots 1902 in which ON pixels are arranged in a circular shape is present. However, as described above, the growth center of the cells 1611 and 1612 is shifted by one pixel relative to the cells 1601 and 1603. Accordingly, it can be seen that halftone dots fluctuate as compared with FIG. 18A. FIG. 19B illustrates multivalued bitmap data (600 dpi) obtained after performing pseudo high-resolution processing on the binary bitmap data (1,200 dpi) obtained after the phase transfer processing as illustrated in FIG. 19A. In the first area illustrated in FIG. 19B, halftone dots indicated by solid line frames 1903, halftone dots indicated by dashed-dotted line frames 1904, halftone dots indicated by broken line frames 1905, and halftone dots indicated by dashed-two dotted line frames 1906 are formed. Also, in the second area, halftone dots indicated by the frames 1903, halftone dots indicated by the frames 1904, halftone dots indicated by the frames 1905, and halftone dots indicated by the frames 1906 are formed. FIG. 19C schematically illustrates halftone dots formed by emitting a laser beam by the laser scanner using the multivalued bitmap data illustrated in FIG. 19B. In the first area illustrated in FIG. 19C, halftone dots indicated by solid line frames 1907, halftone dots indicated by dashed-dotted line frames 1908, halftone dots indicated by broken line frames 1909, and halftone dots indicated by dashed-two dotted line frames 1910 are formed by using the laser scanner. In the present exemplary embodiment, the cells 1611 and 1612 whose the growth center is shifted by one pixel in the main-scanning direction are arranged in the direction of the vector 1606. As a result, as illustrated in FIG. 19A, it can be seen that halftone dots located in the direction of the vector 1606 are shifted as compared with FIG. 18A. Consequently, it is possible to form the same halftone dots in the first area and the second area, which are formed on both sides of the transfer point as a boundary, regardless of the responsiveness of the laser scanner.

The cells whose growth center is shifted by one pixel in the main-scanning direction can also be arranged in the direction of the vector 1605, or in the direction of the sum of the vectors 1605 and 1606.

Also, in the present exemplary embodiment, the combination of the first vector and the second vector is not limited, as long as the vectors each include an odd number of components in the main-scanning direction and the sub-scanning directions. The dithering matrix according to the present exemplary embodiment includes a combination of four cells. However, the configuration of the dithering matrix is not limited to this example. For example, 8 or 16 cells may be combined and a half of the cells may be arranged so as to shift the growth center by one pixel in the main-scanning direction with respect to the remaining half of the cells.

While in the present exemplary embodiment, a configuration has been described in which the phase transfer processing is performed in the sub-scanning direction, the present disclosure is not limited to this configuration. For example, the phase transfer processing may be performed in the main-scanning direction. In this case, the direction in which the growth center of halftone dots is shifted corresponds to the sub-scanning direction perpendicular to the direction in which the phase transfer processing is performed.

In the third exemplary embodiment, a configuration has been described in which the components of the first and second vectors in the main-scanning direction and the sub-scanning direction are a combination of odd numbers in the dithering matrix used by the halftone processing unit 202. However, the dithering matrix need not necessarily be used for all color screens. The dithering matrix used for each color screen converted into a CMYK color space may be changed. For example, the dithering matrix to be adopted may be appropriately changed for each color by using, for example, cyan for the dithering matrix according to the third exemplary embodiment and magenta for the dithering matrix according to the first or second exemplary embodiment. Alternatively, different dithering matrices may be used as the high screen ruling dithering matrix and the low screen ruling dithering matrix, respectively.

As described above, in the present exemplary embodiment, the dithering matrix has been used in which the cell growth center is shifted by one pixel relatively in the main-scanning direction in a plurality of cells constituting the dithering matrix in which the components of the first and second vectors are a combination of odd numbers. Consequently, the same halftone dots can be formed in the first area and the second area, which are formed on both sides of the transfer point as a boundary, regardless of the responsiveness of the laser scanner, and thus the first and second areas can be reproduced with the same density and color.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Embodiments of the present disclosure can also be realized by a computerized configuration(s) of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computerized configuration(s) of the system or apparatus by, for example, reading out and executing the computer executable instructions from the storage medium to perform the functions of one or more of the above-described embodiment(s). The computerized configuration (s) may comprise one or more of a processor, memory, central processing unit (CPU), micro processing unit (MPU), circuitry, or combinations thereof, and may include a network of separate computers or separate computer processors. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2017-243007, filed Dec. 19, 2017, and No. 2018-086501, filed Apr. 27, 2018, which are each hereby incorporated by reference herein in their entirety.

What is claimed is:

1. An image forming apparatus comprising:

a controlling portion having a processor which executes a set of instructions or having a circuitry, the controlling portion being configured to:

execute halftone processing using a dithering matrix on input image data with a first resolution, and output the image data having been subjected to the halftone processing;

perform correction on the image data having been subjected to the halftone processing to shift a pixel in a sub-scanning direction at a correction position in a main-scanning direction, the correction position being determined based on correction information for correcting distortion resulting from curvature of a scan line to form an image according to the output image data; and generate image data with a converted resolution by performing resolution conversion processing on the corrected image data to convert the resolution of the image data from the first resolution to a second resolution lower than the first resolution, wherein the dithering matrix includes a plurality of sub-matrices, wherein an arrangement of a threshold in a first sub-matrix is configured so as to form a first halftone dot having a first line shape for an input image with a predetermined density, wherein an arrangement of a threshold in a second sub-matrix adjacent to the first sub-matrix is configured so as to form a second halftone dot with the same angle as the first line shape and having a center position different from the first halftone dot for the input image with the predetermined density, and wherein the first halftone dot and the second halftone dot form a line shape with a predetermined screen angle in an image having been subjected to the halftone processing, the image being obtained after executing the halftone processing on the input image with the predetermined density by using the first sub-matrix and the second sub-matrix.

2. The image forming apparatus according to claim 1, wherein image data with the second resolution is generated in the resolution conversion processing, by determining a value of one pixel after a resolution is converted with reference to values of a plurality of pixels in the corrected image data.

3. The image forming apparatus according to claim 1, wherein a total number of thresholds in the sub-scanning direction of the first sub-matrix and the second sub-matrix is an even number, and a re-sampling interval in the resolution conversion processing is an even number.

4. The image forming apparatus according to claim 1, further comprising an image forming device, wherein the controlling portion is further configured to form an image based on image data, the resolution of which is converted, on a sheet by using the image forming device.

5. An image forming method comprising:

executing halftone processing using a dithering matrix on input image data with a first resolution, and outputting the image data having been subjected to the halftone processing;

performing correction on the image data having been subjected to the halftone processing to shift a pixel in a sub-scanning direction at a correction position in a main-scanning direction, the correction position being determined based on correction information for correcting distortion resulting from curvature of a scan line to form an image according to the output image data; and generating image data with a converted resolution obtained by performing resolution conversion processing on the corrected image data to convert the resolution of the image data from the first resolution to a second resolution lower than the first resolution, wherein the dithering matrix includes a plurality of sub-matrices, wherein an arrangement of a threshold in a first sub-matrix is configured so as to form a first halftone dot having a first line shape for an input image with a predetermined density, wherein an arrangement of a threshold in a second sub-matrix adjacent to the first sub-matrix is configured so as to form a second halftone dot with the same angle as the first line shape and having a center position different from the first halftone dot for the input image with the predetermined density, and wherein the first halftone dot and the second halftone dot form a line shape with a predetermined screen angle in an image having been subjected to the halftone processing, the image being obtained after executing the halftone processing on the input image with the predetermined density by using the first sub-matrix and the second sub-matrix.

6. The image forming method according to claim 5, wherein in the resolution conversion processing, image data with the second resolution is generated by determining a value of one pixel with a converted resolution with reference to values of a plurality of pixels in the corrected image data.

7. The image forming method according to claim 5, wherein a total number of thresholds in the sub-scanning direction of the first sub-matrix and the second sub-matrix is an even number, and a re-sampling interval in the resolution conversion processing is an even number.

* * * * *